(12) United States Patent
Falkenberg

(10) Patent No.: US 12,126,497 B2
(45) Date of Patent: Oct. 22, 2024

(54) PREDICTION-BASED DATA TRANSMISSION BY INTERNET OF THINGS (IoT) DEVICES

(71) Applicant: Parsa Wireless Communications LLC, Stamford, CT (US)

(72) Inventor: Andreas Falkenberg, Escondido, CA (US)

(*) Notice: Subject to any disclaimer, the term of this patent is extended or adjusted under 35 U.S.C. 154(b) by 0 days.

(21) Appl. No.: 17/868,719

(22) Filed: Jul. 19, 2022

(65) Prior Publication Data
US 2023/0065410 A1    Mar. 2, 2023

Related U.S. Application Data

(60) Provisional application No. 63/239,721, filed on Sep. 1, 2021.

(51) Int. Cl.
*H04L 41/147* (2022.01)
*G16Y 10/75* (2020.01)
(Continued)

(52) U.S. Cl.
CPC ............ *H04L 41/147* (2013.01); *G16Y 10/75* (2020.01); *G16Y 40/30* (2020.01);
(Continued)

(58) Field of Classification Search
CPC . H04L 41/147; H04L 41/0803; H04L 41/082; G16Y 10/75; G16Y 40/30; H04W 24/02; H04W 24/10; H04W 56/0045
See application file for complete search history.

(56) References Cited

U.S. PATENT DOCUMENTS

| | | |
|---|---|---|
| 6,771,670 B1 | 8/2004 | Pfahler |
| 2010/0266063 A1 | 10/2010 | Harel |

(Continued)

FOREIGN PATENT DOCUMENTS

| | | |
|---|---|---|
| CN | 111294789 A | 6/2020 |
| EP | 2389034 B1 | 3/2011 |

(Continued)

OTHER PUBLICATIONS

Scheffel et al., WSN Data Confidence Attribution Using Predictors, 2018 Eighth Latin-American Symposium on Dependable Computing (LADC), IEEE Computer Society, p. 145-154, total 10 Pages. (Year: 2018).*

(Continued)

*Primary Examiner* — Brian J. Gillis
*Assistant Examiner* — Chhian (Amy) Ling
(74) *Attorney, Agent, or Firm* — John F. Vodopia PC

(57) ABSTRACT

A method of data transmission in a 5G network includes receiving, by an internet of things (IoT) device, one or more configuration parameters associated with a prediction-based model; performing a measurement by the IoT device; determining, by the IoT device, a first data sample based on the measurement performed by the IoT device; determining, by the IoT device based on the prediction-based model and using the one or more configuration parameters, whether to transmit the first data sample to a non-terrestrial networking (NTN) node; and transmitting the first data sample to the NTN node in response to determining to transmit the first data sample. The transmitting may indicate that a predicted value corresponding to the first data sample is erroneous.

20 Claims, 29 Drawing Sheets

(51) Int. Cl.
| | |
|---|---|
| *G16Y 40/30* | (2020.01) |
| *H04L 41/0803* | (2022.01) |
| *H04L 41/082* | (2022.01) |
| *H04W 24/02* | (2009.01) |
| *H04W 24/10* | (2009.01) |
| *H04W 56/00* | (2009.01) |

(52) U.S. Cl.
CPC ........ *H04L 41/0803* (2013.01); *H04L 41/082* (2013.01); *H04W 24/02* (2013.01); *H04W 24/10* (2013.01); *H04W 56/0045* (2013.01)

(56) References Cited

U.S. PATENT DOCUMENTS

| | | |
|---|---|---|
| 2017/0303157 A1 | 10/2017 | Siomina |
| 2019/0182632 A1* | 6/2019 | Fujishiro ............... H04W 48/16 |
| 2019/0207662 A1* | 7/2019 | Zhou ................. H04W 72/0446 |
| 2019/0215256 A1* | 7/2019 | Dhanabalan ........... G06N 20/00 |
| 2019/0386771 A1 | 12/2019 | Liu |
| 2020/0077458 A1 | 3/2020 | Stauffer |
| 2020/0091978 A1 | 3/2020 | Noh |
| 2020/0350969 A1 | 11/2020 | Shimezawa |
| 2020/0396591 A1 | 12/2020 | Ou |
| 2020/0413301 A1 | 12/2020 | Shi |
| 2021/0051505 A1 | 2/2021 | Xu |
| 2021/0099324 A1* | 4/2021 | Choi ....................... H04W 4/70 |
| 2021/0105055 A1 | 4/2021 | Chae |
| 2021/0138927 A1* | 5/2021 | Maeng ................... B60L 58/12 |
| 2021/0259040 A1 | 8/2021 | Babaei |
| 2021/0274525 A1 | 9/2021 | Wei |
| 2021/0297147 A1* | 9/2021 | Qaise ................. H04B 7/18504 |
| 2021/0360578 A1* | 11/2021 | Manolakos ........... G01S 5/0221 |
| 2021/0410180 A1 | 12/2021 | Tsai |
| 2022/0060923 A1* | 2/2022 | Zheng ................... H04W 24/02 |
| 2022/0141086 A1* | 5/2022 | Baird ................. H04L 41/0893 709/221 |
| 2022/0182859 A1* | 6/2022 | Da Silva ........... H04W 52/0219 |
| 2023/0053572 A1* | 2/2023 | Yang ..................... H04W 60/04 |

FOREIGN PATENT DOCUMENTS

| | | |
|---|---|---|
| EP | 3509343 A1 | 1/2019 |
| WO | 2015169371 A1 | 11/2015 |
| WO | 2016141514 A1 | 9/2016 |
| WO | 2016196044 A1 | 12/2016 |
| WO | 2017086843 A1 | 5/2017 |
| WO | 2018142345 A1 | 8/2018 |
| WO | 2020150952 A1 | 7/2020 |
| WO | 2020167205 A1 | 8/2020 |
| WO | 2020167747 A1 | 8/2020 |
| WO | 2022180226 A1 | 9/2020 |
| WO | 2020220233 A1 | 11/2020 |
| WO | 2020247043 A1 | 12/2020 |
| WO | 2021023280 A1 | 2/2021 |
| WO | 2021033085 A1 | 2/2021 |
| WO | 2021078357 A1 | 4/2021 |
| WO | 2021098074 A1 | 5/2021 |
| WO | 2021152405 A1 | 8/2021 |
| WO | 2021163527 A1 | 8/2021 |
| WO | 2021228406 A1 | 11/2021 |
| WO | 2021242157 A1 | 12/2021 |
| WO | 2022078804 A1 | 4/2022 |
| WO | 2022082727 A1 | 4/2022 |

OTHER PUBLICATIONS

Dâmaso et al., "Using Coloured Petri Nets for Evaluating the Power Consumption of Wireless Sensor Networks", Published Jun. 15, 2014, Hindawi Publishing Corporation, International Journal of Distributed Sensor Networks, vol. 2014, Article ID 423537, 13 pages. (Year: 2014).*

GPP TSG RAN Meeting #88-e; RP-201038; Revised Work Item on NR Multicast and Broadcast Services (2013); Huwai; Jun. 29, 2020.
3GPP TS 36.300; 3rd Generation Partnership Project; Technical Specification Group Radio Access Network; NR; Radio Resource Control (RRC) protocol specification (Release 16) (Jun. 2021).
3GPP TS 38.331;3rd Generation Partnership Project; Technical Specification Group Radio Access Network; NR; Medium Access Control (MAC) protocol specification (Release 16); (Dec. 2020).
3GPP TSG WG1 Meeting #103-E; Intel Corp., Sidelink Enhancements for UE Power Saving; R1-2008998; Oct. 26, 2020.
3GPP TSG RAN WG1 #106-e; Interdigital Inc.; Sidelink Resourse Allocation for Power Saving; R1-2108035; Aug. 16, 2021.
3GPP TSG RAN WG2 Meeting of #114-e; Report from email discussion [AT114-e][027][QoE] Start and Stop (Lenovo); May 19, 2021.
Scheffel, et al.; WSN Data Confidence Attribution Using Predictors; 2018 Eighth Latin American Symposium on Dependable Computing (LADC); 2018.
3GPP_TS_28_404; 3rd Generation Partnership Project; Technical Solution Group Services and System Aspects; Mar. 27, 2020.
3GPP TSG RAN WG2 Meeting # 114-e; Further Discussion on QoE Measurement Collection in NR Standalone; R2_2105214; May 19, 2021.
3GPP TSG-RAN WG3 #112-e; ZTE, China Telecom; TP for TS 38.300 Introduce NR QoE; May 17, 2021.
3GPP TR 38.890; Apr. 2021; Study on NR QoE Management and Optimizations for Diverse Services; Release 17; Apr. 9, 2021.
3GPP TSG RAN WG1 #105-e; Feature Lead Summary # 5 on RAN basic functions for broadcast/multicast for UEs in RRC_IDLE/RRC_Inactive States; May 10, 2021.
3GPP YSG-RAN WG2 Meeting #112-e; Qualcomm; NR Multicast-Broadcast Services and Configuration for UEs in Different RRC States; R2_2009038; Nov. 2, 2020.
3GPP YSG-RAN WG2 Meeting #111 Electronic; Scope and Architecture Analysis of NR MBS; R2_2007442; Aug. 17, 2020.
3GPP TSG-RAN WG2 Meeting #113e; Futurewei; Discussion on NR MBS Solutions of Mode 2 Delivery; R2-2100631; Jan. 25, 2021.
3GPP TSG-RAN WG2 Meeting #114-e; MBA MAC Layer and Group Scheduling Aspects; R2-2104876; May 19, 2021.
3GPP TSG-RAN WG2 Meeting #113bis electronic; Discussion on QoE Measurement Pausing and Resuming; R2-2103146; Apr. 2021.
3GPP TR 23.757; Study on Architectural Enhancements for 5G Multicast-Broadcast Services (Release 17); Mar. 2021.
3GPP FSG-RAN WG2 Meeting #111 electronic; Overview of NR MBS; R2-20070033; Aug. 18, 2020.
3GPP TSG-RAN WG2 Meeting #113-bis-e; ZTE Corp.; Discussion on Pause/Resume NR QoE Reporting; R2-2104271; Apr. 12, 2021.
3GPP TSG-RAN WG2 Meeting 113bis-e; Multicast Session Reception in RRC Inactive; R2-2103907; Apr. 12, 2021.
3GPP TSG RAN WG1 #105-e; Intel Corp.; NR MBS Group Scheduling for RRC_Connected UEs; R1-2104928; May 19, 2021.
3GPP TSG-RAN WG2 Meeting #113bis Electronic; QoE Reporting Control by RAN Awareness on QoE Parameter; R2-2103556; Apr. 12, 2021.
3GPP TSG-RAN WG2 Meeting #112-e; ZTE; Discussion on QoE in NR; R2-2010476; Nov. 2, 2020.
3GPP TSG-RAN WG2 Meeting #112-e; Nokia; Analysis of Solutions for Paging Collision; R2-2009264; Nov. 2, 2020.
3GPP TSG RAN WG2 #113bis; Ericsson; Configuration and Reporting for QoE Management; R2-2103049; Apr. 12, 2021.
3GPP TSG-RAN WG2 Meeting #97; Change Request; R2-1702256; Feb. 13, 2017.
3GPP TSG RAN WG1 Meeting #92bis; Apple; Discussion on Beam Measurement and Reporting; R1-1804770; Apr. 16, 2018.
3GPP TSG-RAN #111-e Qualcomm summary of off line discussion Jan. 25-Feb. 4, 2021.
Notification of transmittal of the ISR and the WO of the ISA mailed Aug. 12, 2022 in PCT/US2022/029953.

* cited by examiner

FIG. 3A

| Transport channel / Logical channel | BCH | PCH | DL-SCH |
|---|---|---|---|
| BCCH | X | | |
| PCCH | | X | |
| CCCH | | | X |
| DCCH | | | X |
| DTCH | | | X |

FIG. 3B

| Transport channel / Logical channel | RACH | UL-SCH |
|---|---|---|
| CCCH | | X |
| DCCH | | X |
| DTCH | | X |

FIG. 3C

| Transport channel / Logical channel | SL-BCH | SL-SCH |
|---|---|---|
| SBCCH | X | |
| SCCH | | X |
| STCH | | X |

| Physical channel | | PDSCH | PDCCH | PBCH |
|---|---|---|---|---|
| Transport channel | BCH | | | X |
| | PCH | X | | |
| | DL-SCH | X | | |

FIG. 4A

| Physical channel | | PUSCH | PUCCH | PRACH |
|---|---|---|---|---|
| Transport channel | UL-SCH | X | | |
| | RACH | | | X |

FIG. 4B

| Physical channel | | PSSCH | PSCCH | PSFCH | PSBCH |
|---|---|---|---|---|---|
| Transport channel | SL-BCH | | | | X |
| | SL-SCH | X | | | |

FIG. 4C

| Physical Signal | DM-RS | PT-RS | PRS | CSI-RS | PSS | SSS | SRS | S-PSS | S-SSS |
|---|---|---|---|---|---|---|---|---|---|
| DL | X | X | X | X | X | X | | | |
| UL | X | X | | | | | X | | |
| SL | X | X | | X | | | | X | X |

FIG. 6

| Platforms | Altitude range | Orbit | Typical beam footprint size |
|---|---|---|---|
| Low-Earth Orbit (LEO) satellite | 300 – 1500 km | Circular around the earth | 100 – 1000 km |
| Medium-Earth Orbit (MEO) satellite | 7000 – 25000 km | | 100 – 1000 km |
| Geostationary Earth Orbit (GEO) satellite | 35 786 km | notional station keeping position fixed in terms of elevation/azimuth with respect to a given earth point | 200 – 3500 km |
| UAS platform (including HAPS) | 8 – 50 km (20 km for HAPS) | | 5 - 200 km |
| High Elliptical Orbit (HEO) satellite | 400 – 50000 km | Elliptical around the earth | 200 – 3500 km |

FIG. 16

| eMTC, 200 bytes UL, 50 bytes DL | Battery life TN (year) | Battery life NTN (year) | Change (%) | Battery life TN (year) | Battery life NTN (year) | Change (%) | Battery life TN (year) | Battery life NTN (year) | Change (%) |
|---|---|---|---|---|---|---|---|---|---|
| MCL (dB) | | 164 | | | 154 | | | 144 | |
| 2 hr EDT | 1.0 | 1.0 | ~0 | 8.8 | 8.2 | 6.82 | 22 | 18.4 | 16.36 |
| 2 hr RRC Resume | 0.9 | 0.9 | ~0 | 8.2 | 7.6 | 7.32 | 22 | 18.4 | 16.36 |
| 24 hr EDT | 9.1 | 9.1 | ~0 | 30.0 | 27.0 | 10.0 | 37.0 | 32.5 | 12.16 |
| 24 hr RRC Resume | 8.4 | 8.4 | ~0 | 29.4 | 26.5 | 9.86 | 37.0 | 32.5 | 12.16 |

FIG. 21

```
FeatureSet ::= SEQUENCE {
    ...
    providesSensorData              (supported)
    providesPredictiveModel         (supported)
    ...
}
```

FIG. 22

```
predicitiveModelCoefficients ::=    ENUMERATED { fc0, fc1, fc2, fc3, fc4, fc5, fc6, fc7, fc8,
fc9, fc11, fc13, fc15, fc17, fc19, spare1, ... }
```

FIG. 23

```
predictiveModelConfiguration ::= {

Type ::= { ENUMERATED (RandomForest, GeneralizedlinearModel, K-Means
    Configuration ::= ( Prameter1, Parameter2, ..., ParameterN)
    }

PREDICTION-BASED DATA TRANSMISSION BY INTERNET OF THINGS (IoT) DEVICES

This application claims priority under 35 USC § 119(e) from U.S. Provisional Patent Application No. 63/239,721, filed on Sep. 1, 2021 ("the provisional application"); the content of the provisional patent application is incorporated herein by reference.

BACKGROUND OF THE INVENTION

The present invention is directed to 5G, which is the 5th generation mobile network. It is a new global wireless standard after 1G, 2G, 3G, and 4G networks. 5G enables networks designed to connect machines, objects and devices.

The invention is more specifically directed to maintaining or enhancing battery life in IOT devices, for example, sensors or other measurement devices that, for example, report a system status, or any other important system parameter based on a time schedule which may be periodic and/or on a regular basis. Example embodiments of the invention enhance the power consumption of IoT devices in communications with a non-terrestrial network (NTN) using a prediction-based model.

SUMMARY OF THE INVENTION

In one embodiment, the invention provides a method of data transmission that includes receiving, by an internet of things (IoT) device, one or more configuration parameters associated with a prediction-based model; performing a measurement by the IoT device; determining, by the IoT device, a first data sample based on the measurement performed by the IoT device; determining, by the IoT device based on the prediction-based model and using the one or more configuration parameters, whether to transmit the first data sample to a non-terrestrial networking (NTN) node; and transmitting the first data sample to the NTN node in response to determining to transmit the first data sample. The transmitting may indicate that a predicted value corresponding to the first data sample is erroneous.

The method can include determining, based on the prediction-based model, one or more predicted values corresponding to one or more data samples comprising the first data sample. The determining whether to transmit the first data sample can be based on the one or more data samples and one or more corresponding predicted values corresponding to the one or more data samples. For that matter, the determining whether to transmit the first data sample may be further based on one or more thresholds, or alternatively, may be based on a difference between the first data sample and a corresponding predicted value being larger than a threshold.

The one or more configuration parameters comprise one or more first parameters indicating the one or more thresholds. Alternatively, determining whether to transmit the first data sample may be based on a difference between each of the one or more data samples and the corresponding predicted value being larger than a threshold. A predicted value corresponding to the first data sample may be based on the first data sample and one or more previous data samples. In that case, a number of the one or more previous data samples is pre-configured. The one or more configuration parameters may comprise a first parameter indicating a number of the one or more previous data samples.

The method also can include of claim 1, further comprising transmitting an indication that an absolute value of an error for a predicted value is larger than a threshold. The indication may indicate that the error is positive, or alternatively may indicate that the error is negative. The one or more configuration parameters may comprise a first parameter indicating the threshold. The threshold may have a pre-configured value. And the method also can include transmitting an indication that each of a plurality of absolute values of a plurality of errors for a plurality of predicted values is larger than a threshold. The indication can indicate that each of the plurality of errors is positive and can indicate that each of the plurality of errors is negative. The one or more configuration parameters may comprise a first parameter indicating the threshold, and the threshold may have a pre-configured value.

The method can include receiving, in response to a determination to update the prediction model, one or more second configuration parameters associated with the prediction-based model. In that case, the determination may be made at the non-terrestrial networking (NTN) node. The method also can include that the one or more configuration parameters, used in the prediction-based model, as provided to indicate one or more coefficients of the prediction-based model. The method might also include receiving an activation command indicating activation of the prediction-based model. The activation command may be based on physical layer signaling or medium access control (MAC) layer signaling. The method might also include transmitting a capability message comprising one or more information elements indicating that the internet of things (IoT) device supports one or more parameters associated with data transmission using the prediction-based model.

In another embodiment, the invention provides a method of data transmission that includes transmitting, by a non-terrestrial networking (NTN) node to an internet of things (IoT) device, one or more configuration parameters associated with a prediction-based model; in response to not receiving, by the NTN node, a first data sample from the IoT device at a first timing associated with the first data sample: determining that a predicted value corresponding to the first data sample is usable, and determining the predicted value based on the prediction-based model; and in response to receiving, by the NTN node, the first data sample from the IoT device at the first timing: determining that the predicted value is not usable. Preferably, the first timing is based on a periodicity.

The method may further comprise receiving an indication that an absolute value of an error for a predicted value is larger than a threshold. The indication may indicate that the error is positive or negative. And the method may include updating, by the non-terrestrial networking node (NTN), the prediction model based on the indication, and may include receiving an indication that each of a plurality of absolute values of a plurality of errors for a plurality of predicted values is larger than a threshold. The indication can indicate that each of the plurality of errors is positive or is negative. The method can further include updating, by the non-terrestrial networking node (NTN), wherein the prediction model is based on the indication. Preferably, the one or more configuration parameters used in the prediction-based model indicate one or more coefficients of the prediction-based model. And the method may further include receiving a capability message comprising one or more information elements indicating that the internet of things (IoT) device supports one or more parameters associated with data transmission using the prediction-based model.

BRIEF DESCRIPTION OF THE DRAWINGS

FIG. 3A, FIG. 3B and FIG. 3C show example mappings between logical channels and transport channels in downlink, uplink and sidelink, respectively, according to some aspects of some of various exemplary embodiments of the present disclosure.

FIG. 4A, FIG. 4B and FIG. 4C show example mappings between transport channels and physical channels in downlink, uplink and sidelink, respectively, according to some aspects of some of various exemplary embodiments of the present disclosure.

FIG. 6 shows example physical signals in downlink, uplink and sidelink according to some aspects of some of various exemplary embodiments of the present disclosure.

FIG. 16 shows an example types of satellites (or UAS platforms) according to some aspects of some of various exemplary embodiments of the present disclosure.

FIG. 21 shows an example of battery life with 200 bytes UL data and 50 bytes DL data.

FIG. 22 shows an example message according to some aspects of some of various exemplary embodiments of the present disclosure.

FIG. 23 shows an example message according to some aspects of some of various exemplary embodiments of the present disclosure.

FIG. 24 shows an example message according to some aspects of some of various exemplary embodiments of the present disclosure.

DETAILED DESCRIPTION

Figure 1:
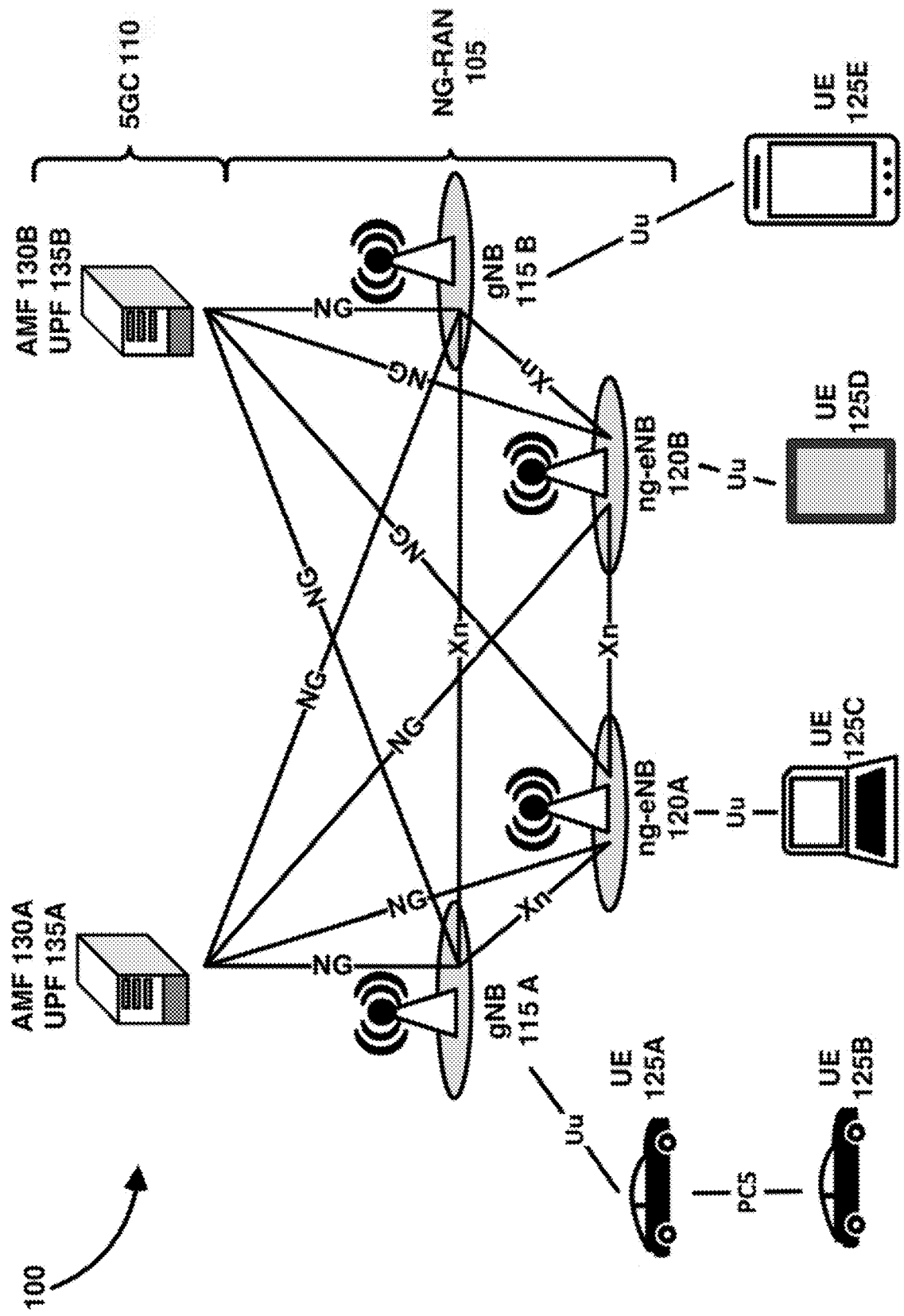
FIG. 1 shows an example of a system of mobile communications according to some aspects of some of various exemplary embodiments of the present disclosure.

FIG. 1 shows an example of a system of mobile communications 100 according to some aspects of some of various exemplary embodiments of the present disclosure. The system of mobile communication 100 may be operated by a wireless communications system operator such as a Mobile Network Operator (MNO), a private network operator, a Multiple System Operator (MSO), an Internet of Things (IOT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IOT (IIOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5GC) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. The RAN implements a Radio Access Technology (RAT) and resides between User Equipments (UEs) 125 and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UE 125 and the RAN (e.g., the NG-RAN 105) may be referred to as Access Stratum (AS) and the functional layer between the UE 125 and the core network (e.g., the 5GC 110) may be referred to as Non-access Stratum (NAS).

The UEs 125 may include wireless transmission and reception means for communications with one or more nodes in the RAN, one or more relay nodes, or one or more other UEs, etc. Example of UEs include, but are not limited to, smartphones, tablets, laptops, computers, wireless transmission and/or reception units in a vehicle, V2X or Vehicle to Vehicle (V2V) devices, wireless sensors, IoT devices, HOT devices, etc. Other names may be used for UEs such as a Mobile Station (MS), terminal equipment, terminal node, client device, mobile device, etc.

The RAN may include nodes (e.g., base stations) for communications with the UEs. For example, the NG-RAN 105 of the system of mobile communications 100 may comprise nodes for communications with the UEs 125. Different names for the RAN nodes may be used, for example depending on the RAT used for the RAN. A RAN node may be referred to as Node B (NB) in a RAN that uses the UMTS RAT. A RAN node may be referred to as an evolved Node B (eNB) in a RAN that uses LTE/EUTRA RAT. For the illustrative example of the system of mobile communications 100 in FIG. 1, the nodes of an NG-RAN 105 may be either a next generation Node B (gNB) 115 or a next generation evolved Node B (ng-eNB) 120. In this specification, the terms base station, RAN node, gNB and ng-eNB may be used interchangeably. The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and GPRS Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 of the 5GC 110 by means of the NG-C interface and to a User Plane Function (UPF) 135 of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport, IP layer point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing & forwarding; Packet inspection and User plane part of Policy rule enforcement; Traffic usage reporting; Uplink classifier to support routing traffic flows to a data network; Branching point to support multi-homed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication.

PC5-S signaling may be used for unicast link establishment with Direct Communication Request/Accept message. A UE may self-assign its source Layer-2 ID for the PC5 unicast link for example based on the V2X service type. During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may be a link-layer identity that identifies a device or a group of devices that are recipients of sidelink communication frames. The Destination Layer-2 ID may be a link-layer identity that identifies a device that originates sidelink communication frames. In some examples, the Source Layer-2 ID and the Destination Layer-2 ID may be assigned by a management function in the Core Network. The Source Layer-2 ID may identify the sender of the data in NR sidelink communication. The Source Layer-2 ID may be 24 bits long and may be split in the MAC layer into two bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the Medium Access Control (MAC) header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5 Link Identifier may be used to indicate the PC5 unicast link whose sidelink Radio Link failure (RLF) declaration was made and PC5-RRC connection was released.

Figure 2A:
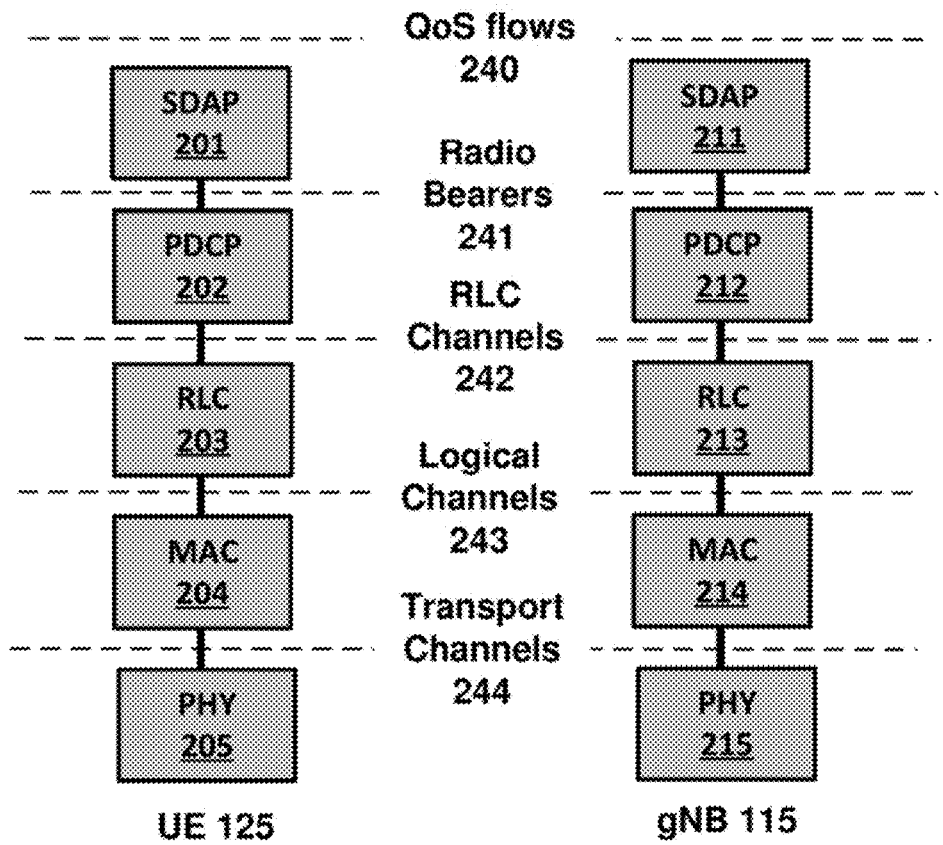
FIG. 2A and FIG. 2B show examples of radio protocol stacks for user plane and control plane, respectively, according to some aspects of some of various exemplary embodiments of the present disclosure.
Figure 2B:
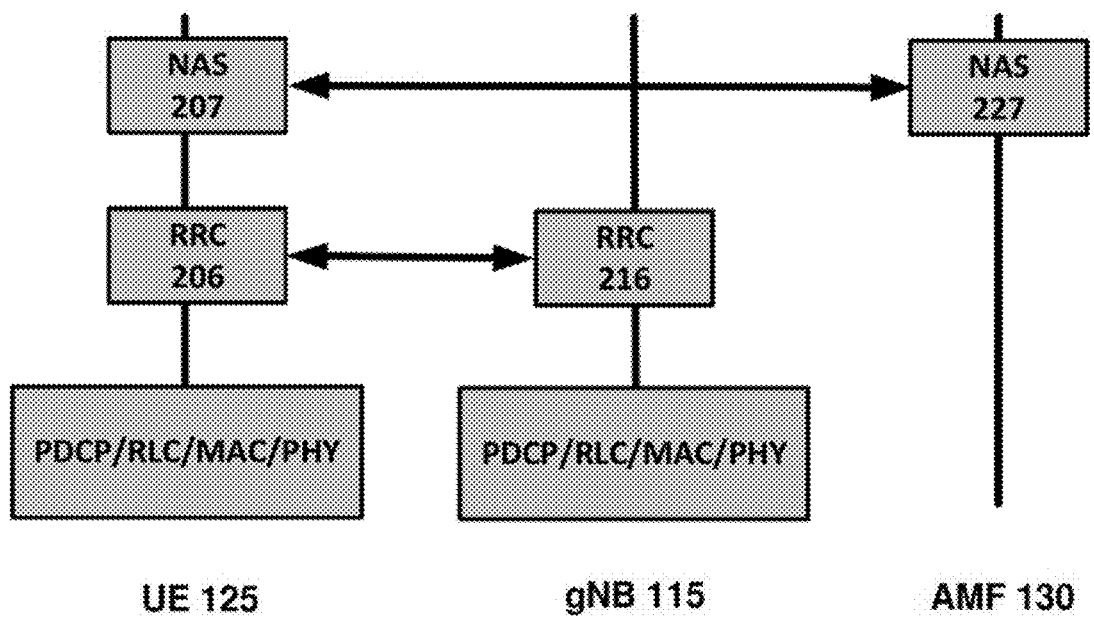

FIG. 2A and FIG. 2B show examples of radio protocol stacks for user plane and control plane, respectively, according to some aspects of some of various exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology (ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and re-segmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

The sidelink specific services and functions of the RRC sublayer over the Uu interface include: Configuration of sidelink resource allocation via system information or dedicated signaling; Reporting of UE sidelink information; Measurement configuration and reporting related to sidelink; and Reporting of UE assistance information for SL traffic pattern (s).

FIG. 3A, FIG. 3B and FIG. 3C show example mappings between logical channels and transport channels in downlink, uplink and sidelink, respectively, according to some aspects of some of various exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink. Sidelink Control Channel (SCCH) is a sidelink channel for transmitting control information (e.g., PC5-RRC and PC5-S messages) from one UE to other UE(s). Sidelink Traffic Channel (STCH) is a sidelink channel for transmitting user information from one UE to other UE(s). Sidelink Broadcast Control Channel (SBCCH) is a sidelink channel for broadcasting sidelink system information from one UE to other UE(s).

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming;

support for both dynamic and semi-static resource allocation; and the support for UE Discontinuous Reception (DRX) to enable UE power saving. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; support for UE discontinuous reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

The sidelink transport channel types include: Sidelink broadcast channel (SL-BCH) and Sidelink shared channel (SL-SCH). The SL-BCH may be characterized by predefined transport format. The SL-SCH may be characterized by support for unicast transmission, groupcast transmission and broadcast transmission; support for both UE autonomous resource selection and scheduled resource allocation by NG-RAN; support for both dynamic and semi-static resource allocation when UE is allocated resources by the NG-RAN; support for HARQ; and support for dynamic link adaptation by varying the transmit power, modulation and coding.

In the sidelink, the following connections between logical channels and transport channels may exist: SCCH may be mapped to SL-SCH; STCH may be mapped to SL-SCH; and SBCCH may be mapped to SL-BCH.

FIG. 4A, FIG. 4B and FIG. 4C show example mappings between transport channels and physical channels in downlink, uplink and sidelink, respectively, according to some aspects of some of various exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The physical channels in the sidelink include Physical Sidelink Shared Channel (PSSCH), Physical Sidelink Control Channel (PSCCH), Physical Sidelink Feedback Channel (PSFCH) and Physical Sidelink Broadcast Channel (PSBCH). The Physical Sidelink Control Channel (PSCCH) may indicate resource and other transmission parameters used by a UE for PSSCH. The Physical Sidelink Shared Channel (PSSCH) may transmit the TBs of data themselves, and control information for HARQ procedures and CSI feedback triggers, etc. At least 6 OFDM symbols within a slot may be used for PSSCH transmission. Physical Sidelink Feedback Channel (PSFCH) may carry the HARQ feedback over the sidelink from a UE which is an intended recipient of a PSSCH transmission to the UE which performed the transmission. PSFCH sequence may be transmitted in one PRB repeated over two OFDM symbols near the end of the sidelink resource in a slot. The SL-SCH transport channel may be mapped to the PSSCH. The SL-BCH may be mapped to PSBCH. No transport channel is mapped to the PSFCH but Sidelink Feedback Control Information (SFCI) may be mapped to the PSFCH. No transport channel is mapped to PSCCH but Sidelink Control Information (SCI) may mapped to the PSCCH.

Figure 5A:
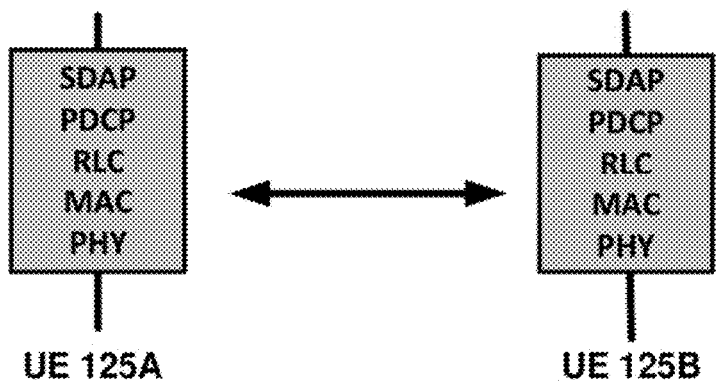
FIG. 5A, FIG. 5B, FIG. 5C and FIG. 5D show examples of radio protocol stacks for NR sidelink communication according to some aspects of some of various exemplary embodiments of the present disclosure.
Figure 5B:
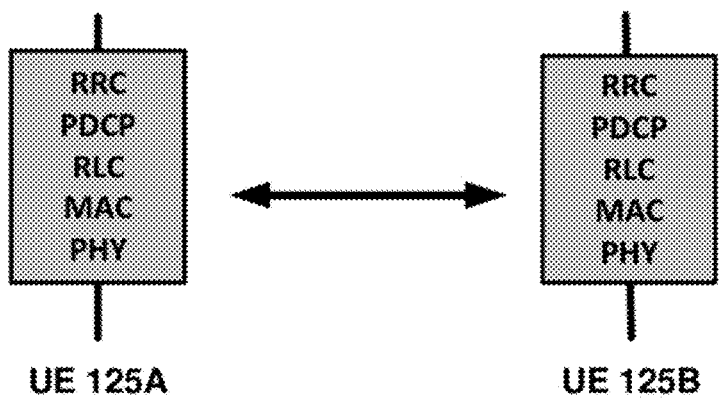
Figure 5C:
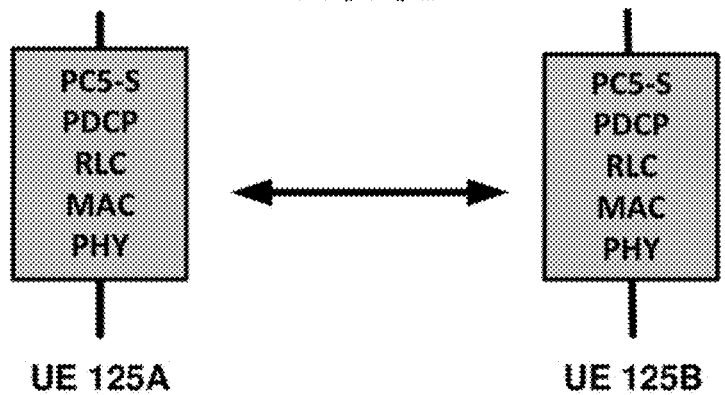
Figure 5D:
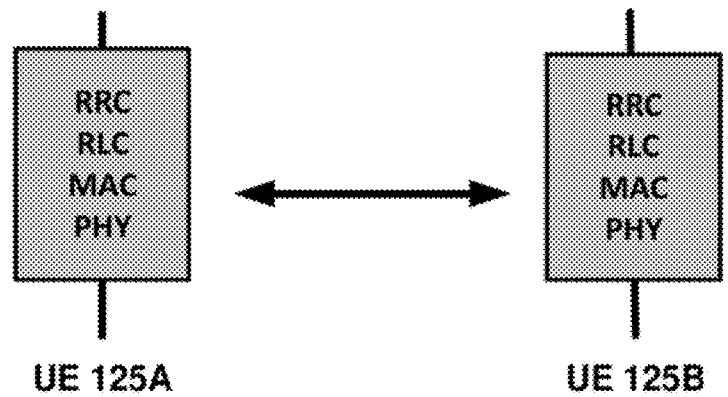

FIG. 5A, FIG. 5B, FIG. 5C and FIG. 5D show examples of radio protocol stacks for NR sidelink communication according to some aspects of some of various exemplary embodiments of the present disclosure. The AS protocol stack for user plane in the PC5 interface (i.e., for STCH) may consist of SDAP, PDCP, RLC and MAC sublayers, and the physical layer. The protocol stack of user plane is shown in FIG. 5A. The AS protocol stack for SBCCH in the PC5 interface may consist of RRC, RLC, MAC sublayers, and the physical layer as shown below in FIG. 5B. For support of PC5-S protocol, PC5-S is located on top of PDCP, RLC and MAC sublayers, and the physical layer in the control plane protocol stack for SCCH for PC5-S, as shown in FIG. 5C. The AS protocol stack for the control plane for SCCH for RRC in the PC5 interface consists of RRC, PDCP, RLC and MAC sublayers, and the physical layer. The protocol stack of control plane for SCCH for RRC is shown in FIG. 5D.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

The MAC sublayer may provide the following services and functions over the PC5 interface: Radio resource selection; Packet filtering; Priority handling between uplink and sidelink transmissions for a given UE; and Sidelink CSI reporting. With logical channel prioritization restrictions in MAC, only sidelink logical channels belonging to the same destination may be multiplexed into a MAC PDU for every unicast, groupcast and broadcast transmission which may be associated to the destination. For packet filtering, a SL-SCH MAC header including portions of both Source Layer-2 ID and a Destination Layer-2 ID may be added to a MAC PDU. The Logical Channel Identifier (LCID) included within a MAC subheader may uniquely identify a logical channel within the scope of the Source Layer-2 ID and Destination Layer-2 ID combination.

The services and functions of the RLC sublayer may be supported for sidelink. Both RLC Unacknowledged Mode (UM) and Acknowledged Mode (AM) may be used in unicast transmission while only UM may be used in groupcast or broadcast transmission. For UM, only unidirectional transmission may be supported for groupcast and broadcast.

The services and functions of the PDCP sublayer for the Uu interface may be supported for sidelink with some restrictions: Out-of-order delivery may be supported only for unicast transmission; and Duplication may not be supported over the PC5 interface.

The SDAP sublayer may provide the following service and function over the PC5 interface: Mapping between a QoS flow and a sidelink data radio bearer. There may be one SDAP entity per destination for one of unicast, groupcast and broadcast which is associated to the destination.

The RRC sublayer may provide the following services and functions over the PC5 interface: Transfer of a PC5-RRC message between peer UEs; Maintenance and release of a PC5-RRC connection between two UEs; and Detection of sidelink radio link failure for a PC5-RRC connection based on indication from MAC or RLC. A PC5-RRC connection may be a logical connection between two UEs for a pair of Source and Destination Layer-2 IDs which may be considered to be established after a corresponding PC5 unicast link is established. There may be one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages may be used for a UE to transfer UE capability and sidelink configuration including SL-DRB configuration to the peer UE. Both peer UEs may exchange their own UE capability and sidelink configuration using separate bi-directional procedures in both sidelink directions.

FIG. 6 shows example physical signals in downlink, uplink and sidelink according to some aspects of some of various exemplary embodiments of the present disclosure. The Demodulation Reference Signal (DM-RS) may be used in downlink, uplink and sidelink and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink, uplink and sidelink and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink and sidelink. CSI-RS may be used for channel state estimation, Reference Signal Received Power (RSRP) measurement for mobility and beam management, time/frequency tracking for demodulation among other uses. CSI-RS may be configured UE-specifically but multiple users may share the same CSI-RS resource. The UE may determine CSI reports and transit them in the uplink to the base station using PUCCH or PUSCH. The CSI report may be carried in a sidelink MAC CE. The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS. The Sidelink PSS (S-PSS) and Sidelink SSS (S-SSS) may be used in sidelink for sidelink synchronization.

Figure 7:
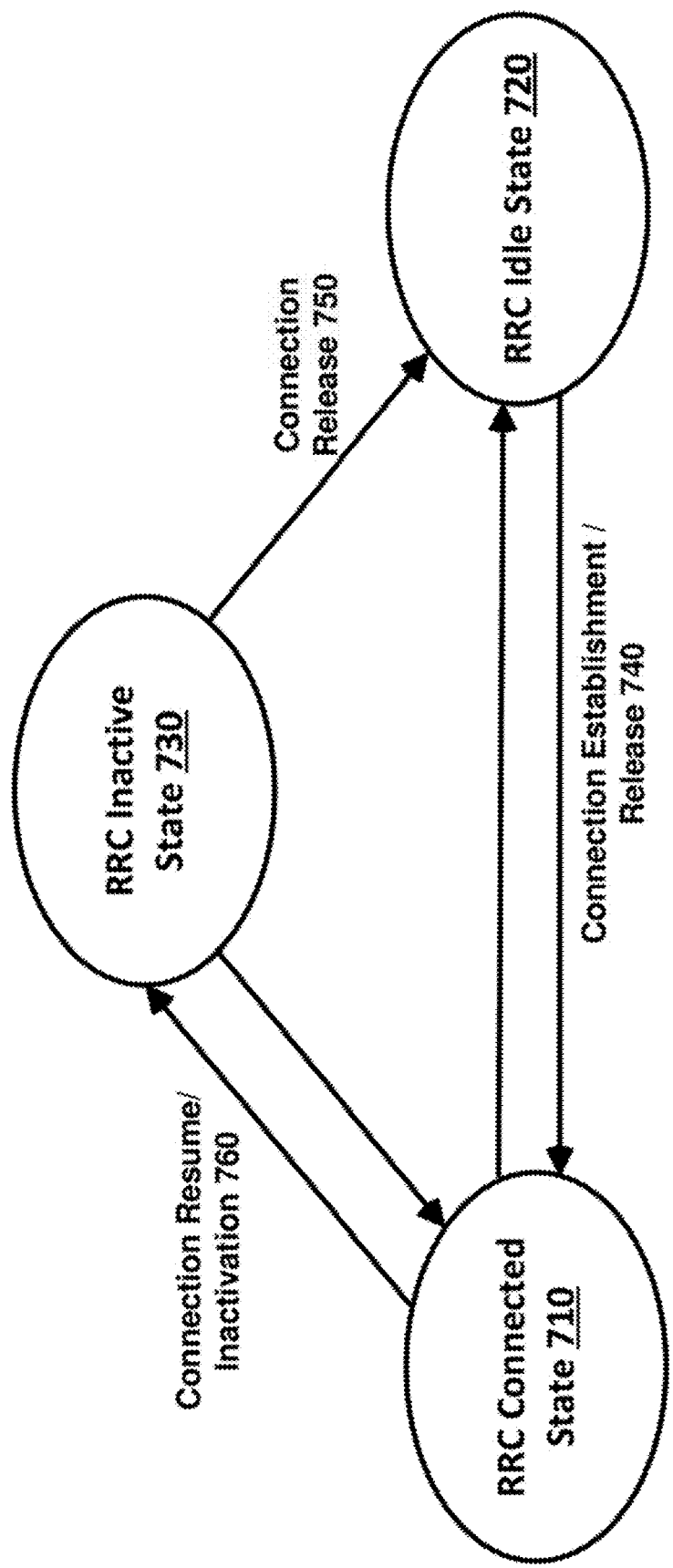
FIG. 7 shows examples of Radio Resource Control (RRC) states and transitioning between different RRC states according to some aspects of some of various exemplary embodiments of the present disclosure.

FIG. 7 shows examples of Radio Resource Control (RRC) states and transitioning between different RRC states according to some aspects of some of various exemplary embodiments of the present disclosure. A UE may be in one of three RRC states: RRC Connected State 710, RRC Idle State 720 and RRC Inactive state 730. After power up, the UE may be in RRC Idle state 720 and the UE may establish connection with the network using initial access and via an RRC connection establishment procedure to perform data transfer and/or to make/receive voice calls. Once RRC connection is established, the UE may be in RRC Connected State 710. The U E may transition from the RRC Idle state 720 to the RRC connected state 710 or from the RRC Connected State 710 to the RRC Idle state 720 using the RRC connection Establishment/Release procedures 740.

To reduce the signaling load and the latency resulting from frequent transitioning from the RRC Connected State 710 to the RRC Idle State 720 when the UE transmits frequent small data, the RRC Inactive State 730 may be used. In the RRC Inactive State 730, the AS context may be stored by both UE and gNB. This may result in faster state transition from the RRC Inactive State 730 to RRC Connected State 710. The UE may transition from the RRC Inactive State 730 to the RRC Connected State 710 or from the RRC Connected State 710 to the RRC Inactive State 730 using the RRC Connection Resume/Inactivation procedures 760. The UE may transition from the RRC Inactive State 730 to RRC Idle State 720 using an RRC Connection Release procedure 750.

Figure 8:
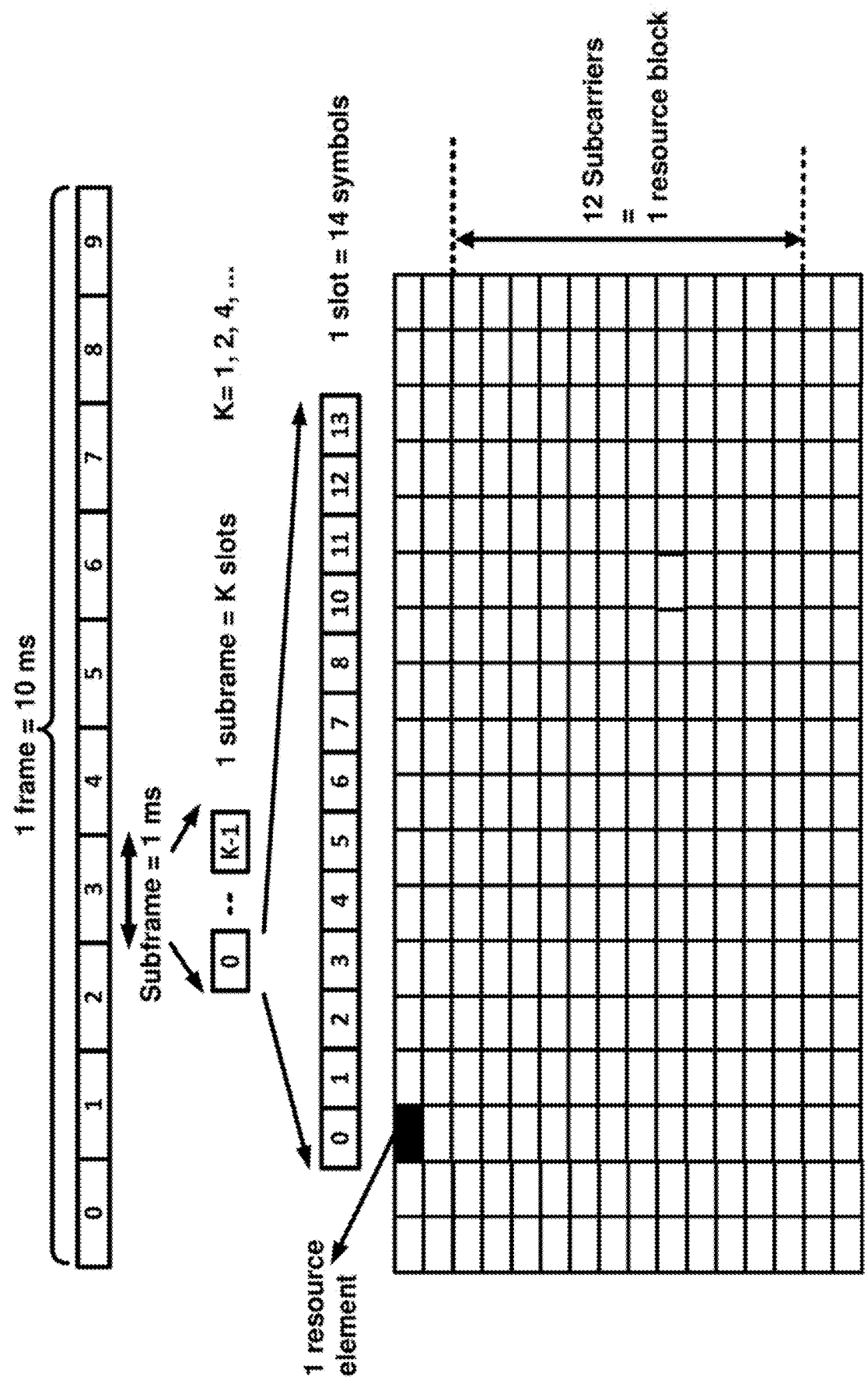
FIG. 8 shows example frame structure and physical resources according to some aspects of some of various exemplary embodiments of the present disclosure.

FIG. 8 shows example frame structure and physical resources according to some aspects of some of various exemplary embodiments of the present disclosure. The downlink or uplink or sidelink transmissions may be organized into frames with 10 ms duration, consisting of ten 1 ms subframes. Each subframe may consist of 1, 2, 4, . . . slots, wherein the number of slots per subframe may depend on the subcarrier spacing of the carrier on which the transmission takes place. The slot duration may be 14 symbols with Normal Cyclic Prefix (CP) and 12 symbols with Extended CP and may scale in time as a function of the used subcarrier spacing so that there is an integer number of slots in a subframe. FIG. 8 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example during 2, 4 or 7 OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 9:
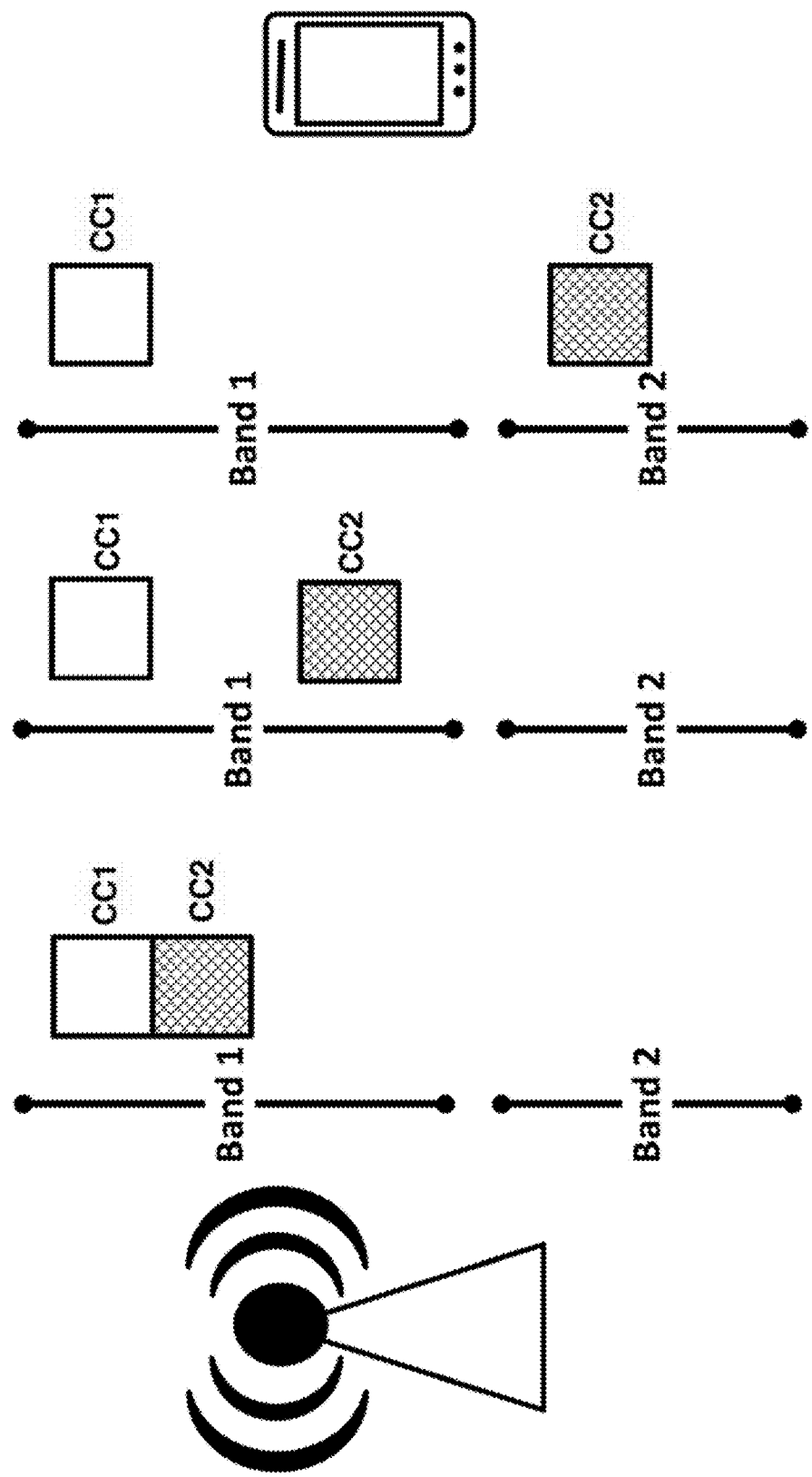
FIG. 9 shows example component carrier configurations in different carrier aggregation scenarios according to some aspects of some of various exemplary embodiments of the present disclosure.

FIG. 9 shows example component carrier configurations in different carrier aggregation scenarios according to some aspects of some of various exemplary embodiments of the present disclosure. In Carrier Aggregation (CA), two or more Component Carriers (CCs) may be aggregated. A UE may simultaneously receive or transmit on one or multiple CCs depending on its capabilities. CA may be supported for both contiguous and non-contiguous CCs in the same band or on different bands as shown in FIG. 9. A gNB and the UE may communicate using a serving cell. A serving cell may be associated with at least with one downlink CC (e.g., may be associated only with one downlink CC or may be associated with a downlink CC and an uplink CC). A serving cell may be a Primary Cell (PCell) or a Secondary Cell (SCell).

A UE may adjust the timing of its uplink transmissions using an uplink timing control procedure. A Timing Advance (TA) may be used to adjust the uplink frame timing relative to the downlink frame timing. The gNB may determine the desired Timing Advance setting and provides that to the UE. The UE may use the provided TA to determine its uplink transmit timing relative to the UE's observed downlink receive timing.

In the RRC Connected state, the gNB may be responsible for maintaining the timing advance to keep the L1 synchronized. Serving cells having uplink to which the same timing advance applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where a SCell may also be used as timing reference cell in certain cases. In a secondary TAG, the UE may use any of the activated SCells of this TAG as a timing reference cell and may not change it unless necessary.

Timing advance updates may be signaled by the gNB to the UE via MAC CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE with single timing advance capability for CA may simultaneously receive and/or transmit on multiple CCs corresponding to multiple serving cells sharing the same timing advance (multiple serving cells grouped in one TAG). A UE with multiple timing advance capability for CA may simultaneously receive and/or transmit on multiple CCs corresponding to multiple serving cells with different timing advances (multiple serving cells grouped in multiple TAGs). The NG-RAN may ensure that each TAG contains at least one serving cell. A non-CA capable UE may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE may have one RRC connection with the network. At RRC connection establishment/re-establishment/handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE may be configured with a plurality of cells comprising a Master Cell Group (MCG) for communications with a master base station, a Secondary Cell Group (SCG) for communications with a secondary base station, and two MAC entities: one MAC entity and for the MCG for communications with the master base station and one MAC entity for the SCG for communications with the secondary base station.

Figure 10:
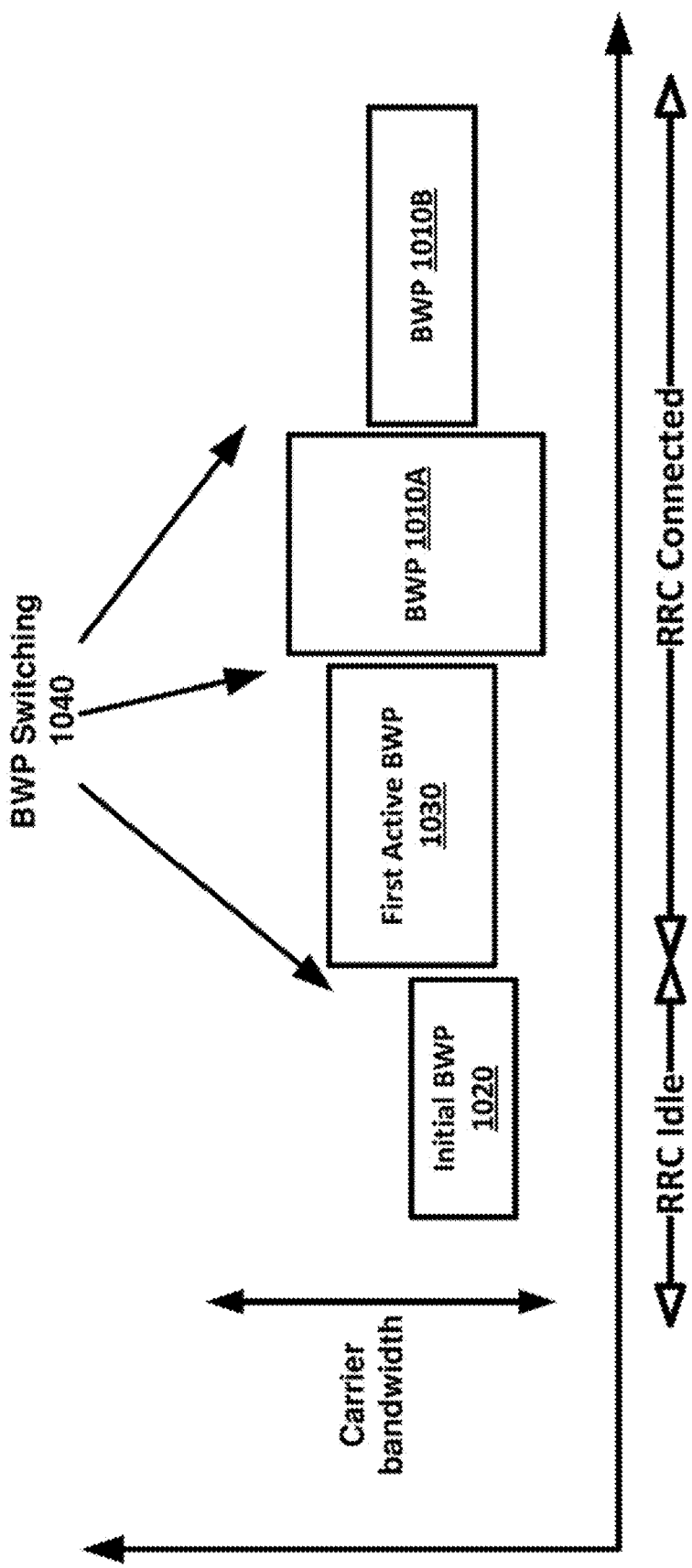
FIG. 10 shows example bandwidth part configuration and switching according to some aspects of some of various exemplary embodiments of the present disclosure.

FIG. 10 shows example bandwidth part configuration and switching according to some aspects of some of various exemplary embodiments of the present disclosure. The UE may be configured with one or more Bandwidth Parts (BWPs) 1010 on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 1020 determined from system information may be used. With Bandwidth Adaptation (BA), for example through BWP switching 1040, the receive and transmit bandwidth of a UE may not be as large as the bandwidth of the cell and may be adjusted. For example, the width may be ordered to change (e.g., to shrink during period of low activity to save power); the location may move in the frequency domain (e.g., to increase scheduling flexibility); and the subcarrier spacing may be ordered to change (e.g., to allow different services). The first active BWP 1020 may be the active BWP upon RRC (re-)configuration for a PCell or activation of a SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 11:
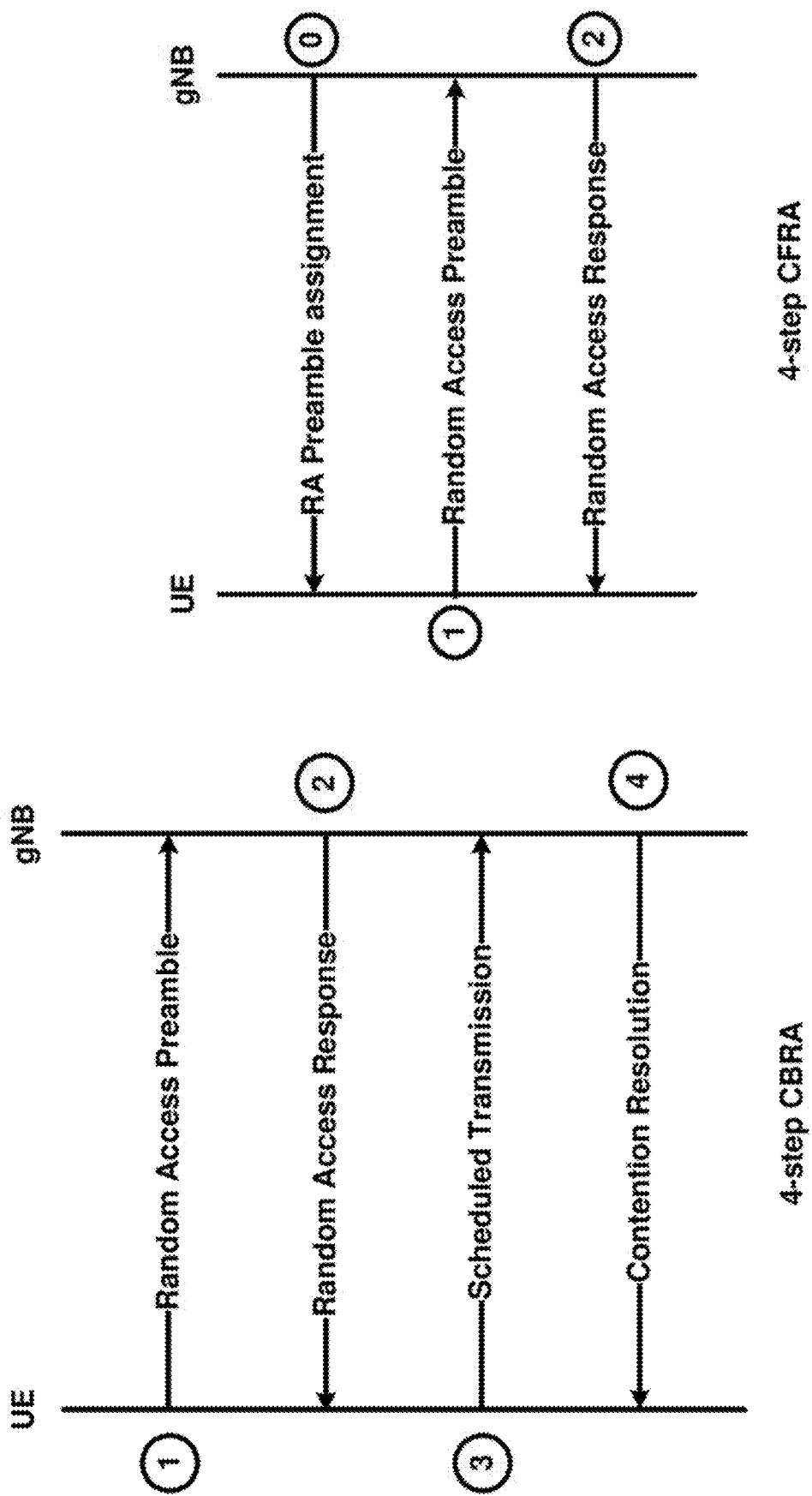
FIG. 11 shows example four-step contention-based and contention-free random access processes according to some aspects of some of various exemplary embodiments of the present disclosure.
Figure 12:
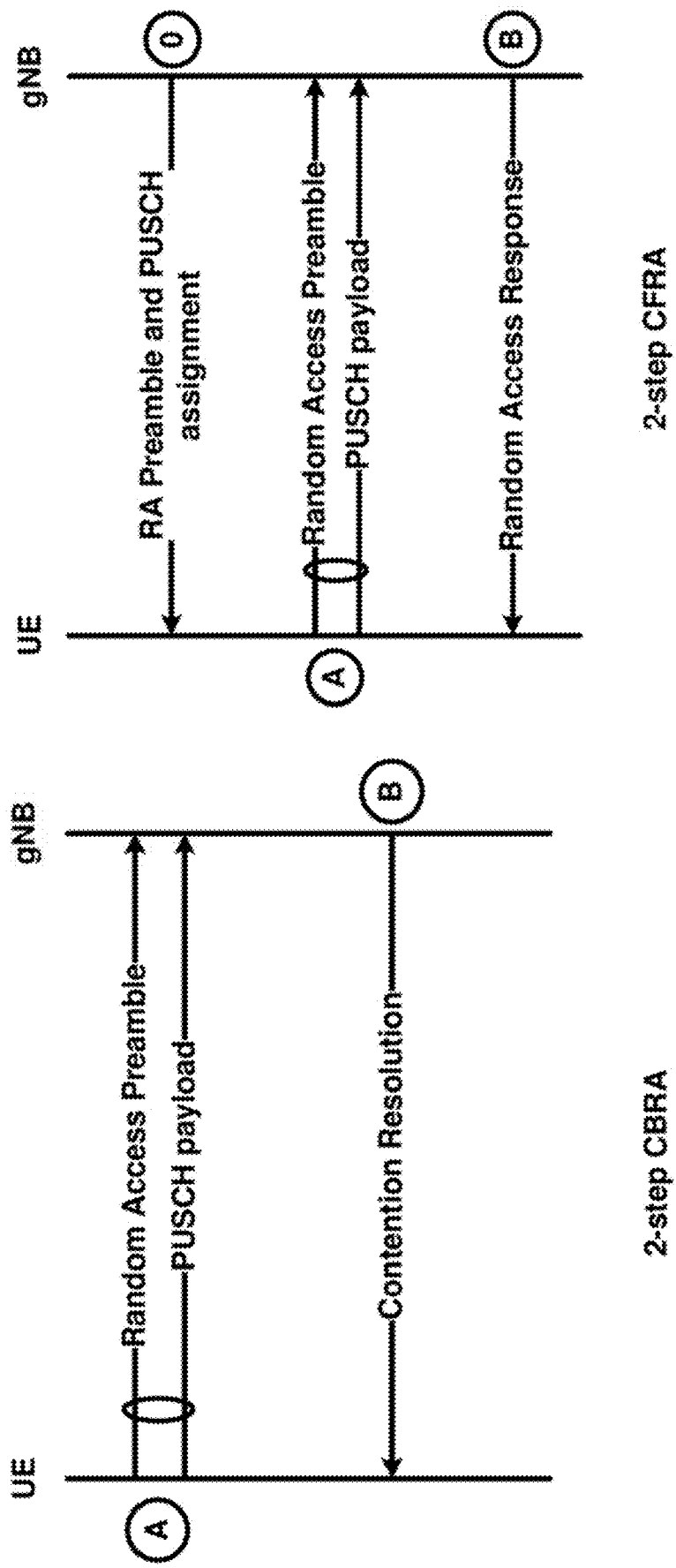
FIG. 12 shows example two-step contention-based and contention-free random access processes according to some aspects of some of various exemplary embodiments of the present disclosure.

FIG. 11 shows example four-step contention-based and contention-free random access processes according to some aspects of some of various exemplary embodiments of the present disclosure. FIG. 12 shows example two-step contention-based and contention-free random access processes according to some aspects of some of various exemplary embodiments of the present disclosure. The random access procedure may be triggered by a number of events, for example: Initial access from RRC Idle State; RRC Connection Re-establishment procedure; downlink or uplink data arrival during RRC Connected State when uplink synchronization status is "non-synchronized"; uplink data arrival during RRC Connected State when there are no PUCCH resources for Scheduling Request (SR) available; SR failure; Request by RRC upon synchronous reconfiguration (e.g. handover); Transition from RRC Inactive State; to establish time alignment for a secondary TAG; Request for Other System Information (SI); Beam Failure Recovery (BFR); Consistent uplink Listen-Before-Talk (LBT) failure on PCell.

Two types of Random Access (RA) procedure may be supported: 4-step RA type with MSG1 and 2-step RA type with MSGA. Both types of RA procedure may support Contention-Based Random Access (CBRA) and Contention-Free Random Access (CFRA) as shown in FIG. 11 and FIG. 12.

The UE may select the type of random access at initiation of the random access procedure based on network configuration. When CFRA resources are not configured, a RSRP threshold may be used by the UE to select between 2-step RA type and 4-step RA type. When CFRA resources for 4-step RA type are configured, UE may perform random access with 4-step RA type. When CFRA resources for 2-step RA type are configured, UE may perform random access with 2-step RA type.

The MSG1 of the 4-step RA type may consist of a preamble on PRACH. After MSG1 transmission, the UE may monitor for a response from the network within a configured window. For CFRA, dedicated preamble for MSG1 transmission may be assigned by the network and upon receiving Random Access Response (RAR) from the network, the UE may end the random access procedure as shown in FIG. 11. For CBRA, upon reception of the random access response, the UE may send MSG3 using the uplink grant scheduled in the random access response and may monitor contention resolution as shown in FIG. 11. If contention resolution is not successful after MSG3 (re)transmission(s), the UE may go back to MSG1 transmission.

The MSGA of the 2-step RA type may include a preamble on PRACH and a payload on PUSCH. After MSGA transmission, the UE may monitor for a response from the network within a configured window. For CFRA, dedicated preamble and PUSCH resource may be configured for MSGA transmission and upon receiving the network response, the UE may end the random access procedure as shown in FIG. 12. For CBRA, if contention resolution is successful upon receiving the network response, the UE may end the random access procedure as shown in FIG. 12; while if fallback indication is received in MSGB, the UE may perform MSG3 transmission using the uplink grant scheduled in the fallback indication and may monitor contention resolution. If contention resolution is not successful after MSG3 (re)transmission(s), the UE may go back to MSGA transmission.

Figure 13:
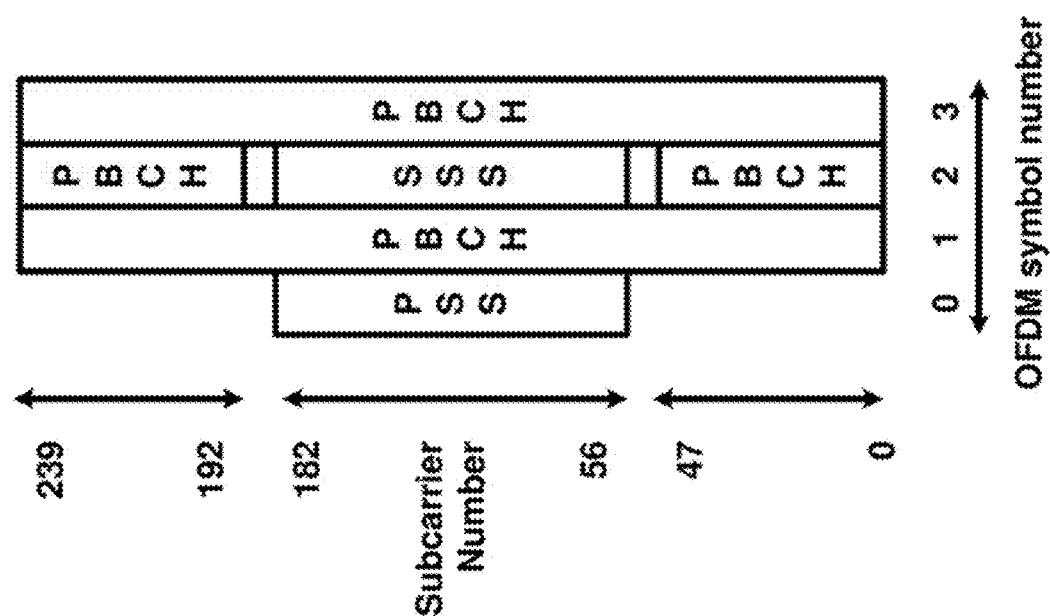
FIG. 13 shows example time and frequency structure of Synchronization Signal and Physical Broadcast Channel (PBCH) Block (SSB) according to some aspects of some of various exemplary embodiments of the present disclosure.

FIG. 13 shows example time and frequency structure of Synchronization Signal and Physical Broadcast Channel (PBCH) Block (SSB) according to some aspects of some of various exemplary embodiments of the present disclosure. The SS/PBCH Block (SSB) may consist of Primary and Secondary Synchronization Signals (PSS, SSS), each occupying 1 symbol and 127 subcarriers (e.g., subcarrier numbers 56 to 182 in FIG. 13), and PBCH spanning across 3 OFDM symbols and 240 subcarriers, but on one symbol leaving an unused part in the middle for SSS as show in FIG. 13. The possible time locations of SSBs within a half-frame may be determined by sub-carrier spacing and the periodicity of the half-frames, where SSBs are transmitted, may be configured by the network. During a half-frame, different SSBs may be transmitted in different spatial directions (i.e., using different beams, spanning the coverage area of a cell).

The PBCH may be used to carry Master Information Block (MIB) used by a UE during cell search and initial access procedures. The UE may first decode PBCH/MIB to receive other system information. The MIB may provide the UE with parameters required to acquire System Information Block 1 (SIB1), more specifically, information required for monitoring of PDCCH for scheduling PDSCH that carries SIB1. In addition, MIB may indicate cell barred status information. The MIB and SIB1 may be collectively referred to as the minimum system information (SI) and SIB1 may be referred to as remaining minimum system information (RMSI). The other system information blocks (SIBs) (e.g., SIB2, SIB3, . . . , SIB10 and SIBpos) may be referred to as Other SI. The Other SI may be periodically broadcast on DL-SCH, broadcast on-demand on DL-SCH (e.g., upon request from UEs in RRC Idle State, RRC Inactive State, or RRC connected State), or sent in a dedicated manner on DL-SCH to UEs in RRC Connected State (e.g., upon request, if configured by the network, from UEs in RRC Connected State or when the UE has an active BWP with no common search space configured).

Figure 14:
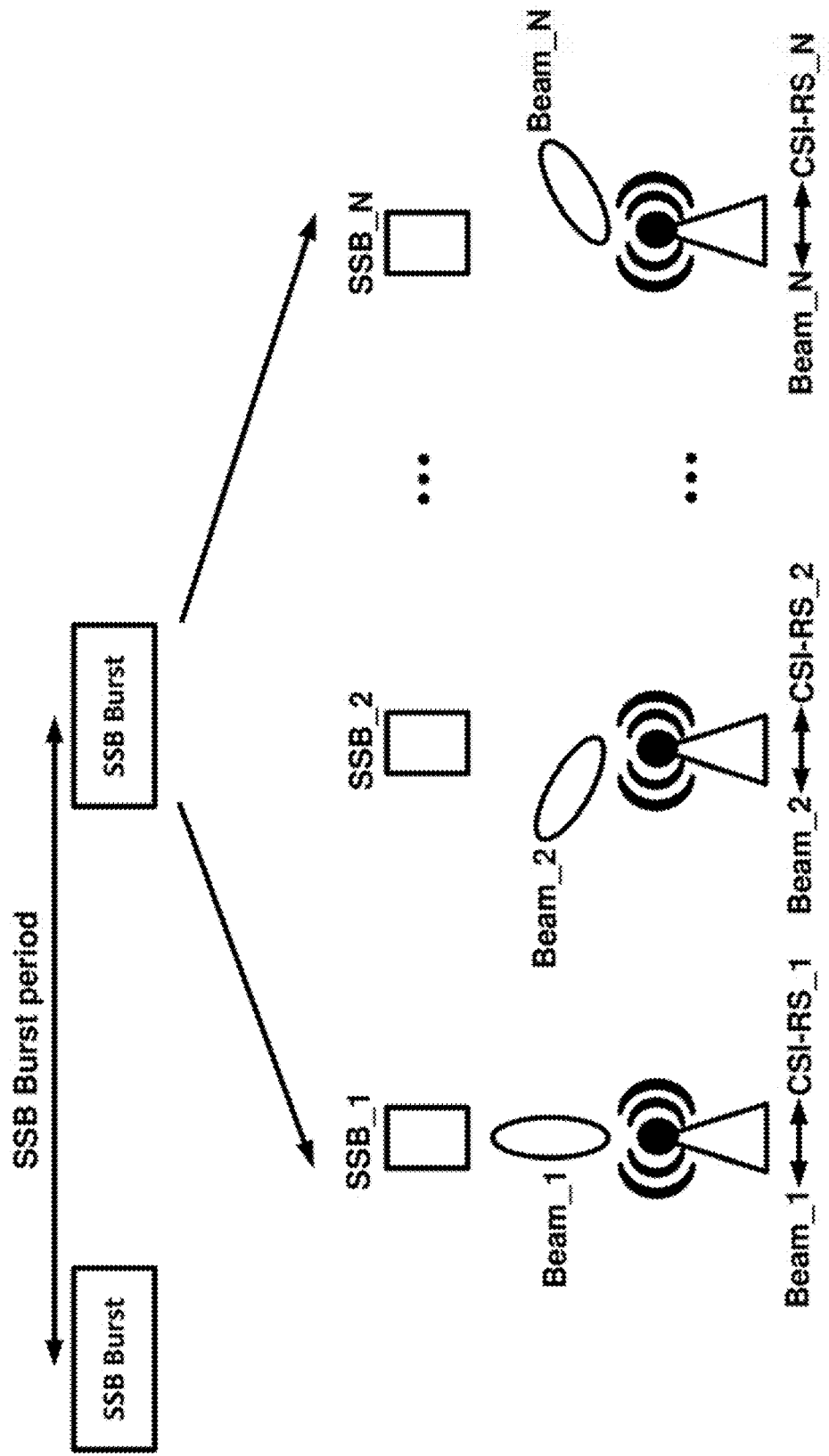
FIG. 14 shows example SSB burst transmissions according to some aspects of some of various exemplary embodiments of the present disclosure.

FIG. 14 shows example SSB burst transmissions according to some aspects of some of various exemplary embodiments of the present disclosure. An SSB burst may include N SSBs and each SSB of the N SSBs may correspond to a beam. The SSB bursts may be transmitted according to a periodicity (e.g., SSB burst period). During a contention-based random access process, a UE may perform a random access resource selection process, wherein the UE first selects an SSB before selecting a RA preamble. The U E may select an SSB with an RSRP above a configured threshold value. In some embodiments, the UE may select any SSB if no SSB with RSRP above the configured threshold is available. A set of random access preambles may be associated with an SSB. After selecting an SSB, the UE may select a random access preamble from the set of random access preambles associated with the SSB and may transmit the selected random access preamble to start the random access process.

In some embodiments, a beam of the N beams may be associated with a CSI-RS resource. A UE may measure CSI-RS resources and may select a CSI-RS with RSRP above a configured threshold value. The UE may select a random access preamble corresponding to the selected CSI-RS and may transmit the selected random access process to start the random access process. If there is no random access preamble associated with the selected CSI-RS, the UE may select a random access preamble corresponding to an SSB which is Quasi-Collocated with the selected CSI-RS.

In some embodiments, based on the UE measurements of the CSI-RS resources and the UE CSI reporting, the base station may determine a Transmission Configuration Indication (TCI) state and may indicate the TC state to the UE, wherein the UE may use the indicated TCI state for reception of downlink control information (e.g., via PDCCH) or data (e.g., via PDSCH). The UE may use the indicated TCI state for using the appropriate beam for reception of data or control information. The indication of the TCI states may be using RRC configuration or in combination of RRC signaling and dynamic signaling (e.g., via a MAC Control element (MAC CE) and/or based on a value of field in the downlink control information that schedules the downlink transmission). The TCI state may indicate a Quasi-Colocation (QCL) relationship between a downlink reference signal such as CSI-RS and the DM-RS associated with the downlink control or data channels (e.g., PDCCH or PDSCH, respectively).

In some embodiments, the UE may be configured with a list of up to M TCI-State configurations, using Physical Downlink Shared Channel (PDSCH) configuration parameters, to decode PDSCH according to a detected PDCCH with DC intended for the UE and the given serving cell, where M may depends on the UE capability. Each TCI-State may contain parameters for configuring a QCL relationship between one or two downlink reference signals and the DM-RS ports of the PDSCH, the DM-RS port of PDCCH or the CSI-RS port(s) of a CSI-RS resource. The quasi co-location relationship may be configured by one or more RRC parameters. The quasi co-location types corresponding to each DL RS may take one of the following values: 'QCL-TypeA': {Doppler shift, Doppler spread, average delay, delay spread}; 'QCL-TypeB': {Doppler shift, Doppler spread}; 'QCL-TypeC': {Doppler shift, average delay}; 'QCL-TypeD': {Spatial Rx parameter}. The UE may receive an activation command (e.g., a MAC CE), used to map TCI states to the codepoints of a DCI field.

Figure 15:
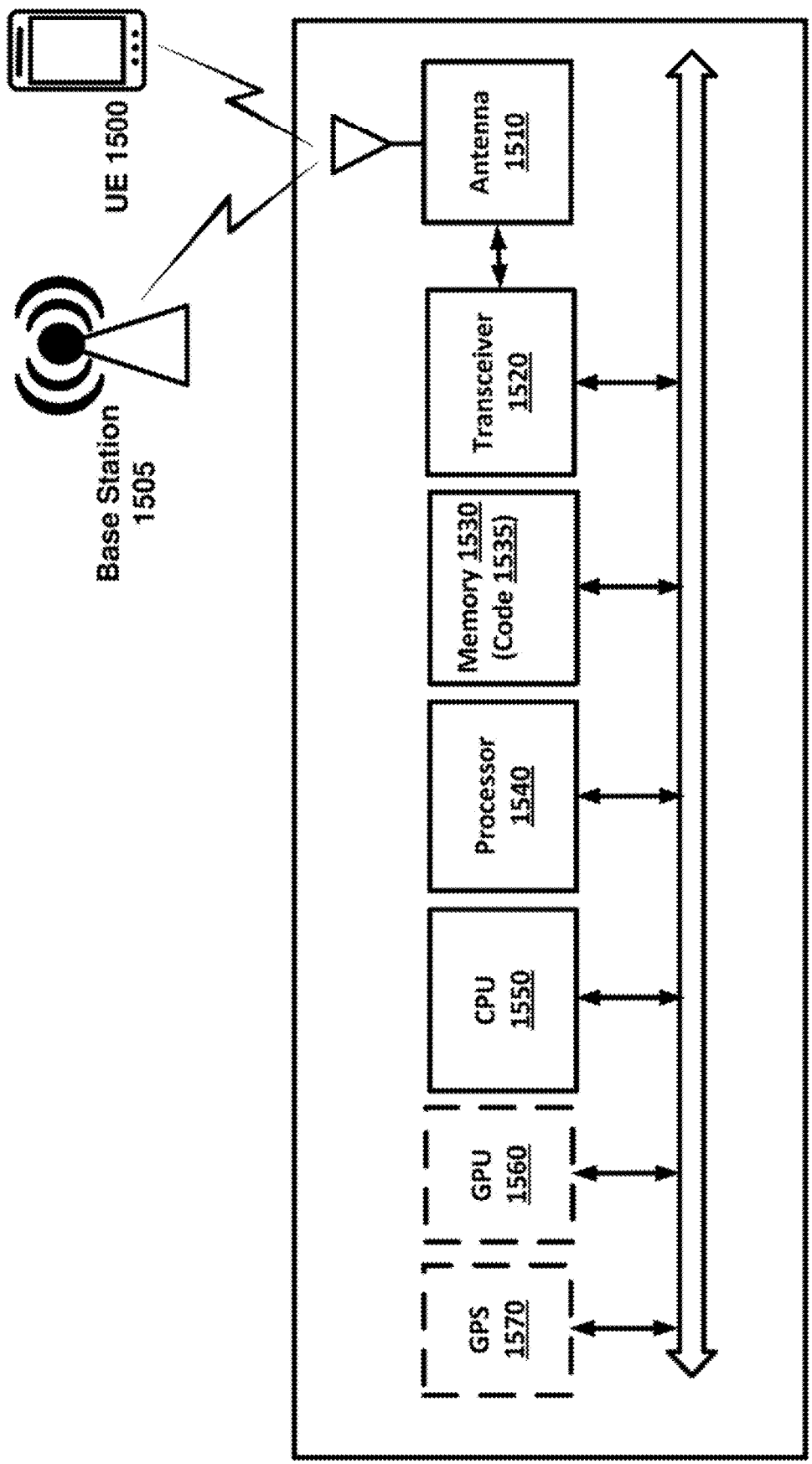
FIG. 15 shows example components of a user equipment and a base station for transmission and/or reception according to some aspects of some of various exemplary embodiments of the present disclosure.

FIG. 15 shows example components of a user equipment and a base station for transmission and/or reception according to some aspects of some of various exemplary embodiments of the present disclosure. All or a subset of blocks and functions in FIG. 15 may be in the base station 1505 and the user equipment 1500 and may be performed by the user equipment 1500 and by the base station 1505. The Antenna 1510 may be used for transmission or reception of electromagnetic signals. The Antenna 1510 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 150 may enable a massive MIMO configuration with tens or hundreds of antenna elements. The Antenna 1510 may enable other multi-antenna techniques such as beamforming. In some examples and depending on the UE 1500 capabilities or the type of UE 1500 (e.g., a low-complexity UE), the UE 1500 may support a single antenna only.

The transceiver 1520 may communicate bi-directionally, via the Antenna 1510, wireless links as described herein. For example, the transceiver 1520 may represent a wireless transceiver at the UE and may communicate bi-directionally with the wireless transceiver at the base station or vice versa. The transceiver 1520 may include a modem to modulate the packets and provide the modulated packets to the Antennas 1510 for transmission, and to demodulate packets received from the Antennas 1510.

The memory 1530 may include RAM and ROM. The memory 1530 may store computer-readable, computer-executable code 1535 including instructions that, when executed, cause the processor to perform various functions described herein. In some examples, the memory 1530 may contain, among other things, a Basic Input/output System (BIOS) which may control basic hardware or software operation such as the interaction with peripheral components or devices.

The processor 1540 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1540 may be configured to operate a memory using a memory controller. In other examples, a memory controller may be integrated into the processor 1540. The processor 1540 may be configured to execute computer-readable instructions stored in a memory (e.g., the memory 1530) to cause the UE 1500 or the base station 1505 to perform various functions.

The Central Processing Unit (CPU) 1550 may perform basic arithmetic, logic, controlling, and Input/output (I/O) operations specified by the computer instructions in the Memory 1530. The user equipment 1500 and/or the base station 1505 may include additional peripheral components such as a graphics processing unit (GPU) 1560 and a Global Positioning System (GPS) 1570. The GPU 1560 is a specialized circuitry for rapid manipulation and altering of the Memory 1530 for accelerating the processing performance of the user equipment 1500 and/or the base station 1505. The GPS 1570 may be used for enabling location-based services or other services for example based on geographical position of the user equipment 1500.

A non-terrestrial network may refer to a network, or segment of networks using RF resources on board a satellite (or Unmanned Aerial System (UAS) platform).

In some examples, Non-Terrestrial Network may include one or more of the following elements:
  One or several sat-gateways that connect the Non-Terrestrial Network to a public data network
    a GEO satellite may be fed by one or several sat-gateways which may be deployed across the satellite targeted coverage (e.g. regional or even continental coverage). The UE in a cell may be served by one sat-gateway.
    A Non-GEO satellite served successively by one or several sat-gateways at a time. The system ensures service and feeder link continuity between the successive serving sat-gateways with sufficient time duration to proceed with mobility anchoring and hand-over.
  A Feeder link or radio link between a sat-gateway and the satellite (or UAS platform).
  A service link or radio link between the user equipment and the satellite (or UAS platform).
  A satellite (or UAS platform) which may implement either a transparent or a regenerative (with on board processing) payload. The satellite (or UAS platform) generate beams may generate several beams over a given service area bounded by its field of view. The footprints of the beams may typically be of elliptic shape. The field of view of a satellite (or UAS platforms) may depend on the on board antenna diagram and min elevation angle.
    A transparent payload: Radio Frequency filtering, Frequency conversion and amplification. Hence, the waveform signal repeated by the payload may be un-changed;
    A regenerative payload: Radio Frequency filtering, Frequency conversion and amplification as well as demodulation/decoding, switch and/or routing, coding/modulation. This may effectively be equivalent to having all or part of base station functions (e.g., gNB) on board the satellite (or UAS platform).
  Inter-satellite links (ISL) optionally in case of a constellation of satellites. This may require regenerative payloads on board the satellites. ISL may operate in RF frequency or optical bands.
  User Equipment may be served by the satellite (or UAS platform) within the targeted service area.

Thanks to the wide service coverage capabilities and reduced vulnerability of space/airborne vehicles to physical attacks and natural disasters, Non-Terrestrial Networks are expected to:
  foster the roll out of 5G service in un-served areas that cannot be covered by terrestrial 5G network (isolated/remote areas, on board aircrafts or vessels) and under-served areas (e.g., sub-urban/rural areas) to upgrade the performance of limited terrestrial networks in cost effective manner, reinforce the 5G service reliability by providing service continuity for M2M/IoT devices or for passengers on board moving platforms (e.g. passenger vehicles-aircraft, ships, high speed trains, bus) or ensuring service availability anywhere especially for critical communications, future railway/maritime/aeronautical communications, and to enable 5G network scalability by providing efficient multicast/broadcast resources for data delivery towards the network edges or even user terminal.

The benefits relate to either Non-Terrestrial networks operating alone or to integrated terrestrial and Non-Terrestrial networks. They will impact coverage, user bandwidth, system capacity, service reliability or service availability, energy consumption, connection density. In some examples, a role for Non-Terrestrial Network components in the 5G system may be expected for the following verticals: transport, Public Safety, Media and Entertainment, eHealth, Energy, Agriculture, Finance, Automotive.

There may be different types of satellites (or UAS platforms) as shown in FIG. 16.

In some examples, GEO satellite and UAS may be used to provide continental, regional or local service. A constellation of LEO and MEO is used to provide services in both Northern and Southern hemispheres. In some case, the constellation can even provide global coverage including polar regions. For the later, this requires appropriate orbit inclination, sufficient beams generated and inter-satellite links.

In some examples, the satellite payload implements frequency conversion and a Radio Frequency amplifier in both up link and down link direction. It may correspond to an analogue RF repeater. The satellite may repeat the NR-Uu radio interface from the feeder link (between the NTN gateway and the satellite) to the service link (between the satellite and the UE) and vice versa.

The Satellite Radio Interface (SRI) on the feeder link is the NR-Uu. In other words, the satellite may not terminate NR-Uu. The NTN GW may support necessary functions to forward the signal of NR-Uu interface. Different transparent satellites may be connected to the same gNB on the ground.

Figure 17:
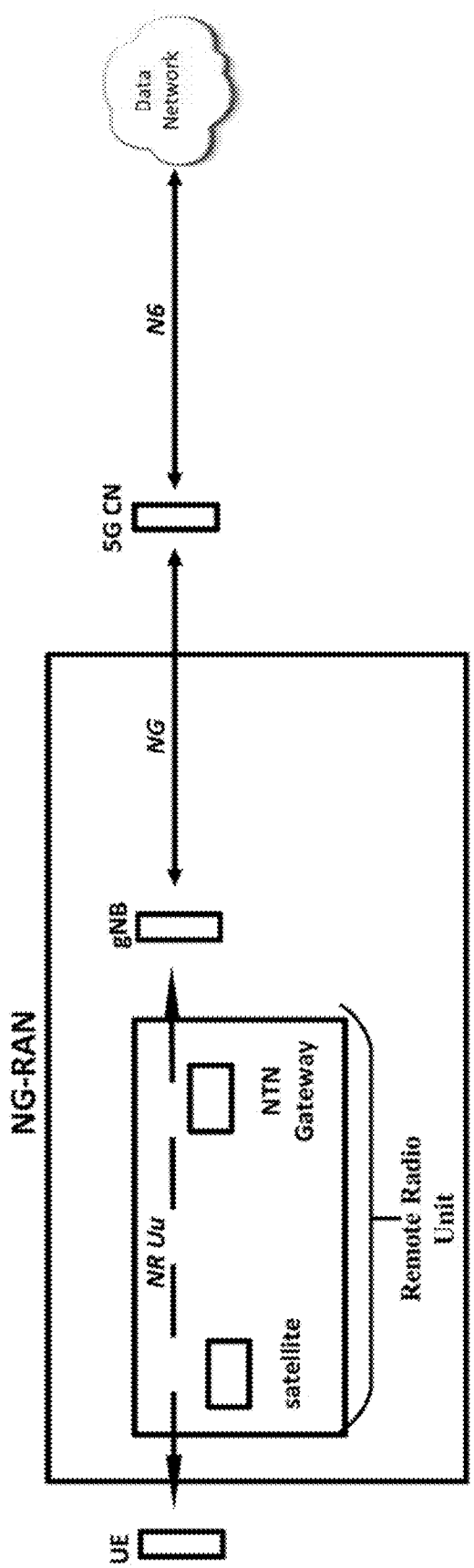
FIG. 17 shows an examples Networking-RAN architecture according to some aspects of some of various exemplary embodiments of the present disclosure.
Figure 18:
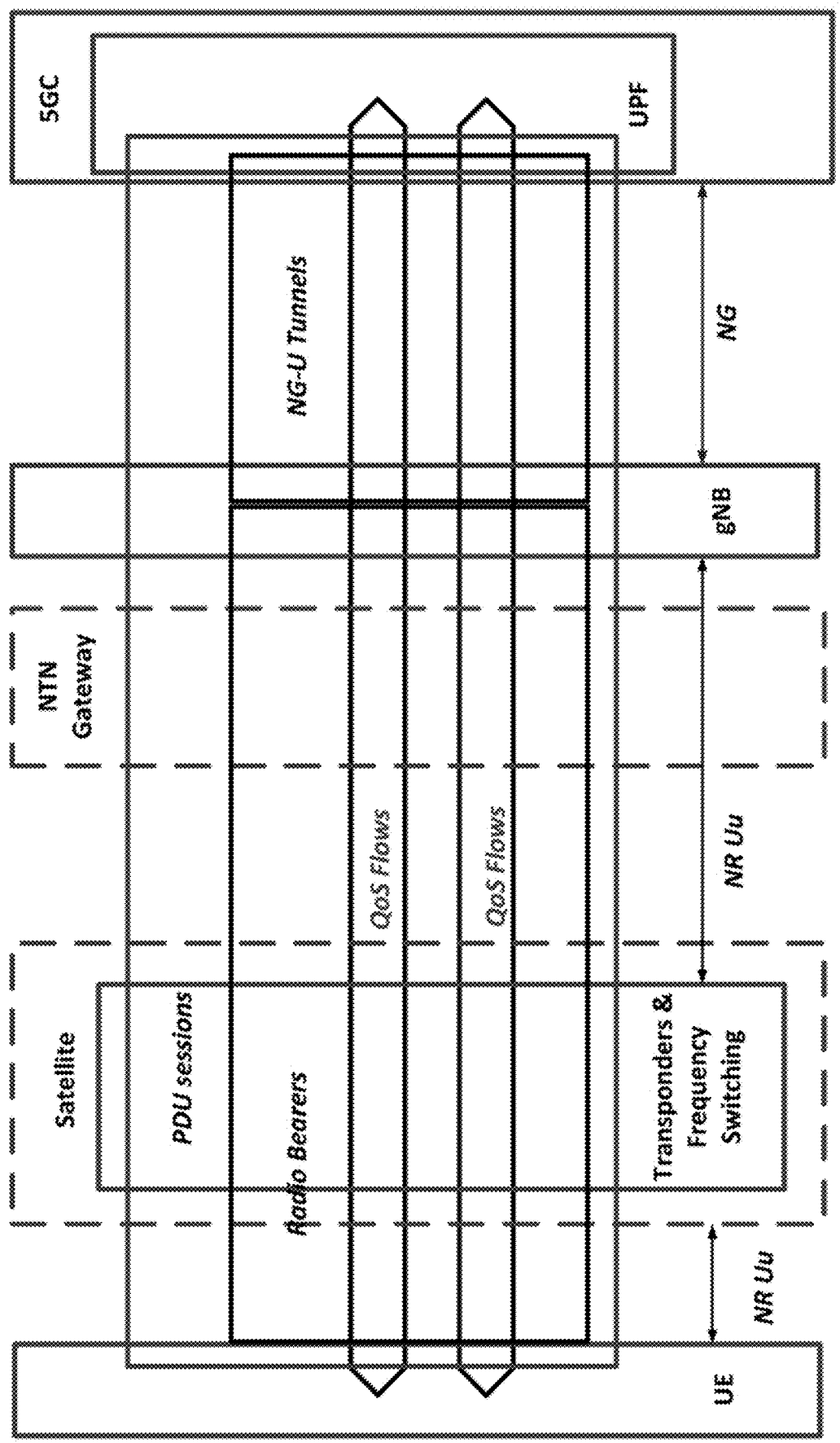
FIG. 18 shows an example architecture of a transparent-satellite based NG-RAN according to some aspects of some of various exemplary embodiments of the present disclosure.
Figure 19:
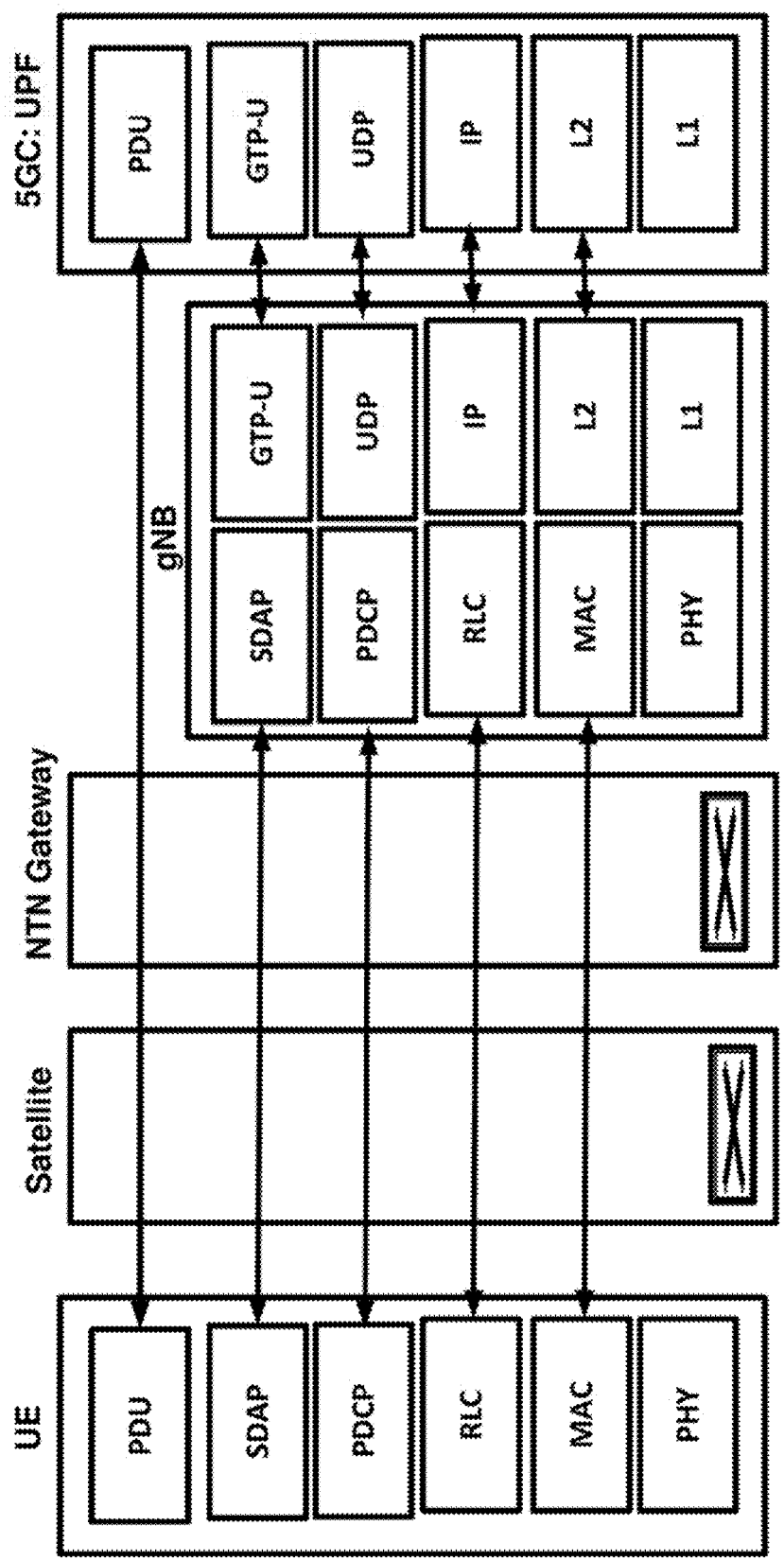
FIG. 19 shows an example user plane protocol stack according to some aspects of some of various exemplary embodiments of the present disclosure.
Figure 20:
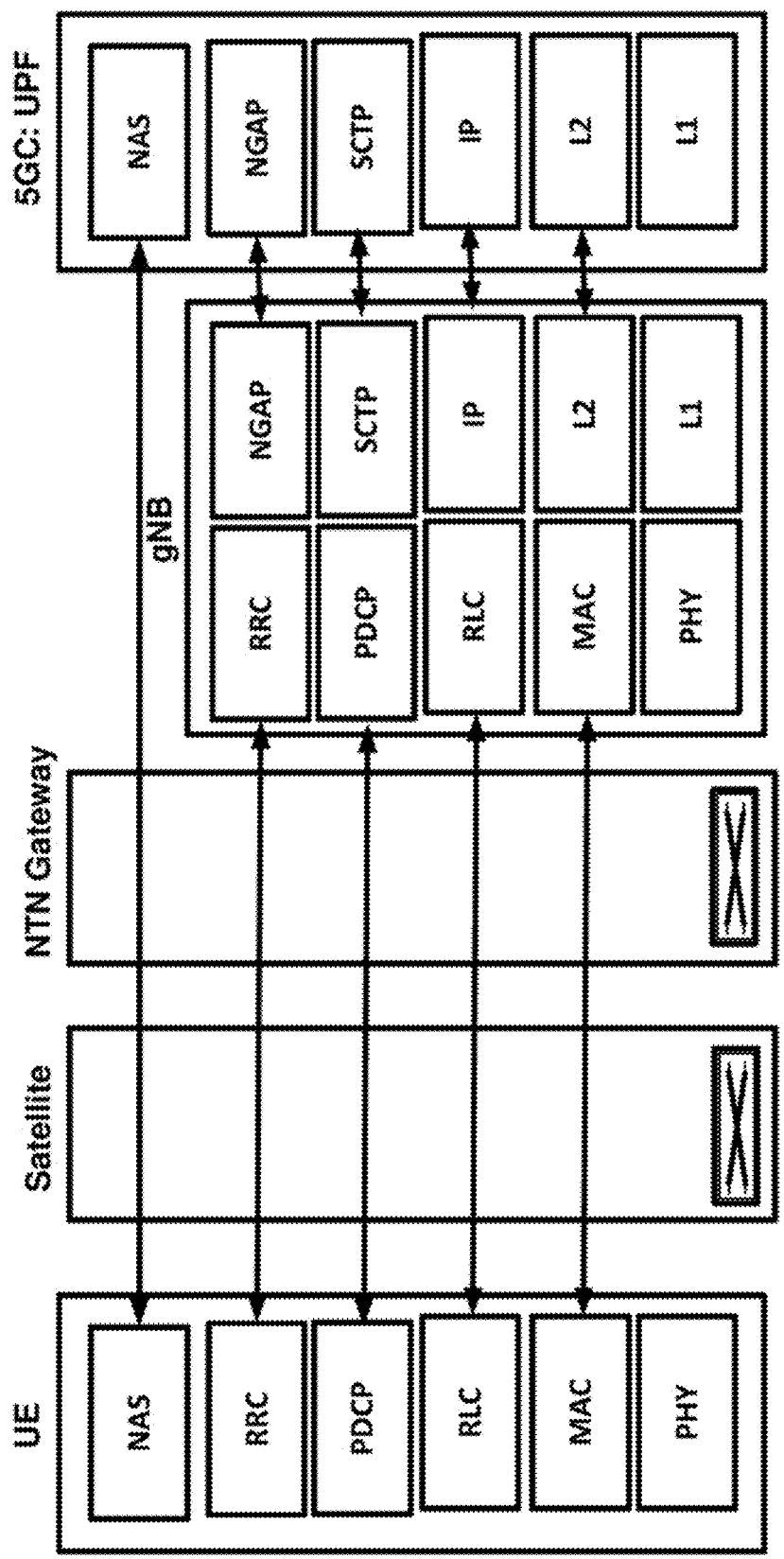
FIG. 20 shows an example control plane protocol stack according to some aspects of some of various exemplary embodiments of the present disclosure.

FIG. 17 shows an examples Networking-RAN architecture with transparent satellite. The architecture of a transparent-satellite based NG-RAN is depicted in FIG. 18. The mapping to QoS flows is also highlighted. The UE may have access to the 5G system via a 3GPP NR based radio interface. An example user plane protocol stack (transparent satellite) is shown in FIG. 19. The user data may be transported between the UE and the 5GC and via the NTN Gateway. An example control plane protocol stack (transparent satellite) is shown in FIG. 20. The NAS (NAS-SM and NAS-MM) signaling from the UE and the NG-AP signaling from the gNB are transported toward the 5GC and vice versa.

The power consumption of the IoT devices is important to enhance the battery life of such devices. An IoT device may represent a sensor or other measurement device, which may report a system status, or any other important system parameter based on a time schedule which may be periodic and/or on a regular basis. Examples are sensors which measure and report environmental data like temperature and humidity. In some examples, the IoT devices may be in remote places and may have limited access to a power supply and may rely heavily on battery power. The power consumption of a IoT device may need to be limited leading to an extended battery life. In some examples, a major contributor to power consumption may be the wireless interface. In some examples, such devices may be in remote places the communication of said sensor data may require the use of non-terrestrial networks (NTN). Example embodiments enhance the power consumption of IoT devices in communications with the NTN network using a prediction-based model.

An example of battery life with 200 bytes UL data and 50 bytes DL data is shown in FIG. 21.

In some examples and with high reporting rate of some IoT devices, the battery life may deteriorate significantly. At least for some of the IoT devices, such as sensor devices, a higher frequency of reporting may be required. Example embodiments may enable handling of data which appears consistently on a regular time interval; use of predictive models which may allow to transfer less data i.e., only anchor points, whereas the bulk of the data may be extrapolated or estimated from the data stream by a predictive model; handling of outliers etc. In some examples, with regular data from sensors, which may monitor a critical device, the device may need to have the capability to report results quickly if needed, but otherwise may not waste bandwidth if it is standard information.

Example embodiments enable a predictive solution. In some examples, the predictive model, besides predicting the measurement results, may as well predict the likelihood of a change of the results. In some examples, at certain thresholds, the predictive model may expect an update. The sensor may, regardless of a change, send an update and therefore also show that it is alive. If said update is not sent after the threshold is reached the network may conclude that the sensor is not operational any more. Example embodiments may minimize power consumption for example for battery powered IoT devices, allow actual data or estimated data to be transferred on a regular basis, and enhance message structures associated with the prediction-based model.

In some examples, the power spent for handling the predictive model, which may be the one-time transmission of the predictive model from the IoT to the NTN device as well as the consistently monitoring and ensuring that the predictive model is generating the correct results, may be considerably lower than transmitting the raw data continuously.

In some examples, an event which is worth to be transmitted from the IoT to the network is happening in regular time intervals say $t_d$ therefore every $t_d$ seconds (milliseconds etc.) a message $m_s$ may be sent. In some examples, for transmitting a message with sensor data samples, the power $P_{TX}(m_s)$ may be consumed. Within a time interval $T_i$, the power consumption to transfer messages may be estimated as $$P_{TX}(T_i) = P_{TX}(m_s) \cdot \frac{T_i}{t_d}.$$

In some examples, a one time transmission of the predictive model may be required during the initialization. In some examples, the IoT may perform predictions itself to ensure that the predictive model is not running away from the real measurements. In some examples, the IoT device may have a power consumption for processing to handle the predictive model. In some examples, the IoT device may perform the predictions in parallel to determine that the predicted information matches with the actual measurements. The power consumption can be calculated as:

$$P_{Pred}(T_i) = P_{TX}(m_{pred}) + P_{Comp}(m_s) \cdot \frac{T_i}{t_d} + P(\text{wrong estimate}) \cdot P_{TX}(T_i).$$

In some examples, the predictive model may be transferred as a message $m_{pred}$ once during the initialization phase. In some examples, additional power may be used to consistently monitor the accuracy of the prediction model.

In some examples, an IoT device may register with the network by the normal means of a device registering. In some examples, the IoT device may inform the NTN that it stored a predictive model. The IoT device may transfer the predictive model to the NTN station (ground station). The IoT device may initialize the predictive model and may transfer the initialization data. In some examples, on both sides the predictive model may be loaded, and the system may be ready to run the model.

In some examples, during the normal operation essentially the IoT device may generate data samples by measurement and in parallel it may generate data samples through the predictive model. In some examples, a compare function may determine if the predicted value or estimated value is within the boundaries of the measured value. If that is the case it may not be necessary to send any data back to the NTN station. If a critical number of false predictions are generated then the IoT may correct the model parameters, which are in parallel may be sent also back to the NTN station.

In some examples, the samples s(t(n)) may be measured at time t(n). In some examples, every $t_d$ a new sample may be measured or generated: t(n+1)=t(n)+$t_d$. A predictive model pred may generate a sample s'(t(n))=pred(s' (t(n−1), . . . , s'(t(n−k))); s'(t(n))=s(t(n))+ε(t(n)).

In some examples, the predictive model may use as many prior samples (shows as k) as needed to generate new predicted samples, whereas each predicted sample may have an error incorporated. If the NTN station does not receive the actual samples since it may only rely on the use of predicted prior values.

In some examples, both the IoT device and the NTN station may perform the same prediction whereas the IoT device may compare the results against the real measured values. If the predicted value is outside of a defined error threshold, then actual measured values, or a correction message, may be sent from the IoT device.

In some examples, with an error threshold $th_{err}$ the following condition needs to be checked by the IoT device: if |ε(t(n))|>$th_{err}$, then send s(t(n)).

In some examples, the condition may be: if for a certain number k it is given that ∀x={n−k, . . . n−1, n}| (|ε(t(x)) |>$th_{err}$) then send the actual measured sample. Which basically means that a history of wrong measurements is needed until corrective action is taken.

In some examples: if ε(t(n))>0 and |ε(t(n))|>$th_{err}$ the IoT device may send a message that the predicted values are too low.

In some examples, if ε(t(n))<0 and |ε(t(n))|>$th_{err}$ the IoT device may send a message that the predicted values are too high.

In some examples, if ε(t(n))>0 and ∀x={n−k, . . . n−1, n}|(|ε(t(x))|>$th_{err}$) the IoT device may send a message that the predicted values are too low.

In some examples, if ε(t(n))<0 and ∀x={n−k, . . . n−1, n}(|ε(t(x))|>$th_{err}$) the IoT device may send a message that the predicted values are too high.

In some examples, parallel to the IoT device, the NTN station may perform the same predictions and may adjust the model as soon as actual data is received from the IoT. In some examples, if s(t(n)) is received, the NTN node may use it. In some examples, if nothing is received at time t(n), the NTN node may use s'(t(n)) instead. In some examples, if message is received stating that predicted value is to low, the NTN node may use s'(t(n))+c·$th_{err}$ with some factor c>1.0. In some examples, if message is received stating that predicted value is too high, the NTN node may use s'(t(n))−c·$th_{err}$ with some factor c>1.0

In some examples, an error may be sent when the predicted value is outside of the threshold boundary so we need to at least correct by the threshold to get the predicted value back to the original value. At this point we also assume that it is cheaper to send a "too-high" or "too-low" message rather than the full sample.

In some examples, the model may be defined as needed by say PMML messages. In some examples, the conditions to trigger corrective message may be flexible and may be freely defined as part of the model. In some examples, all parameters may be freely defined and part of the model. In some examples, the corrective action when a correction message is sent may be freely defined and part of the model.

In some examples, a FeatureSetCombination IE and related fields, a Measurement Report Message, or a ConfigurationOfPredicitveModel IE such as filter coefficients may be enabled or enhanced.

In some examples, a message may enable exchange of a feature, which may provide information of the IoT device and the network capabilities. Specifically in this case the support of a predictive model needs to be added. An example is shown in FIG. 22.

In some examples, a network device may be capable to consume sensor data but not able to support any kind of predictive model which may be indicated as part of system information.

In some examples, measurement report RRC message may be used and/or enhanced for transmission of data measurement data by the IoT device.

In some examples, the predictive model may require certain parameters which may be configurable other than the model description itself. An example is shown in FIG. 23 which may be used for configuring Predictive Model Coefficients.

In some examples as shown in FIG. 24, a set of predefined models may be used with an appropriate number of parameters for adaptation.

In some examples, the configuration may be used to initially setup the predictive model whereas the coefficients may change over time and may be adapted as needed.

Figure 25:
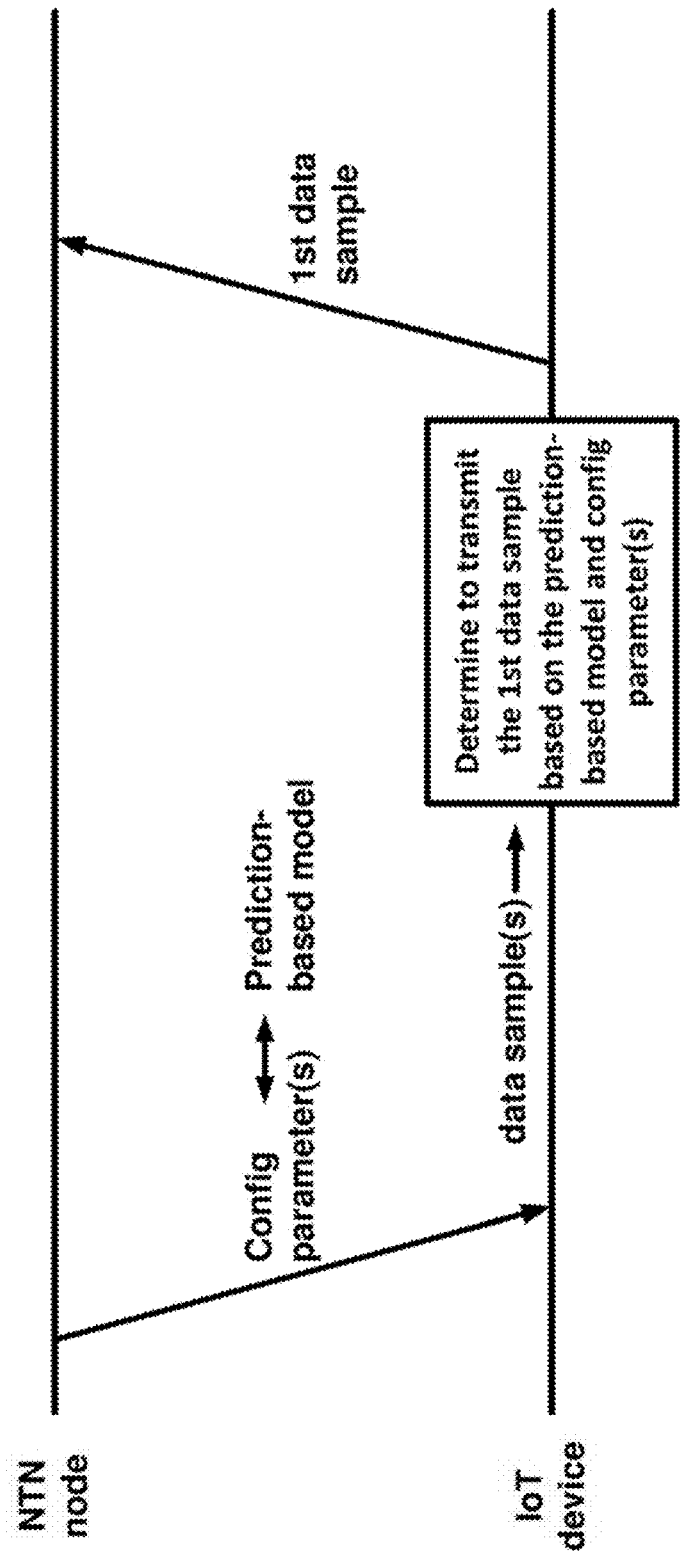
FIG. 25 shows an example process according to some aspects of some of various exemplary embodiments of the present disclosure.

In an example embodiment as shown in FIG. 25, an internet of things (IoT) device may receive one or more messages (e.g., one or more RRC messages) comprising configuration parameters. The configuration parameters may comprise first configuration parameters associated with a prediction-based model. The IoT device may receive the configuration parameters from a non-terrestrial networking (NTN) node (e.g., a ground station). In some examples, the receiving of the configuration parameters, associated with the prediction-based model may be in response to transmitting a capability message comprising one or more information elements indicating that the IoT device is capable of supporting and operating based on the prediction-based model. In some examples, the prediction-based model may be activated in response to receiving the one or more configuration parameters. In some examples, the prediction-based mode may be activated in response to receiving the configuration parameters and an activation command e.g., a DCI or a MAC CE indicating the activation. The prediction-based model may be used by the IoT device for data transmission. The prediction-based model may be used in parallel at the NTN node. The IoT device may determine a first data sample. The first data sample may be based on a measurement performed at the IoT device. For example, the IoT device may be a sensor and the first data sample may be a temperature, humidity, etc. measured via the sensor. In some examples, the data samples may be generated/measured by the IoT device using a pre-determined schedule. In some examples, the pre-determined schedule may be based on a periodicity and the measurements/samples may be performed/generated periodically and based on the schedule/periodicity. The IoT device may determine the timings of the data samples (including the first data sample) based on the schedule/periodicity known at the IoT device and the NTN node.

Figure 26:
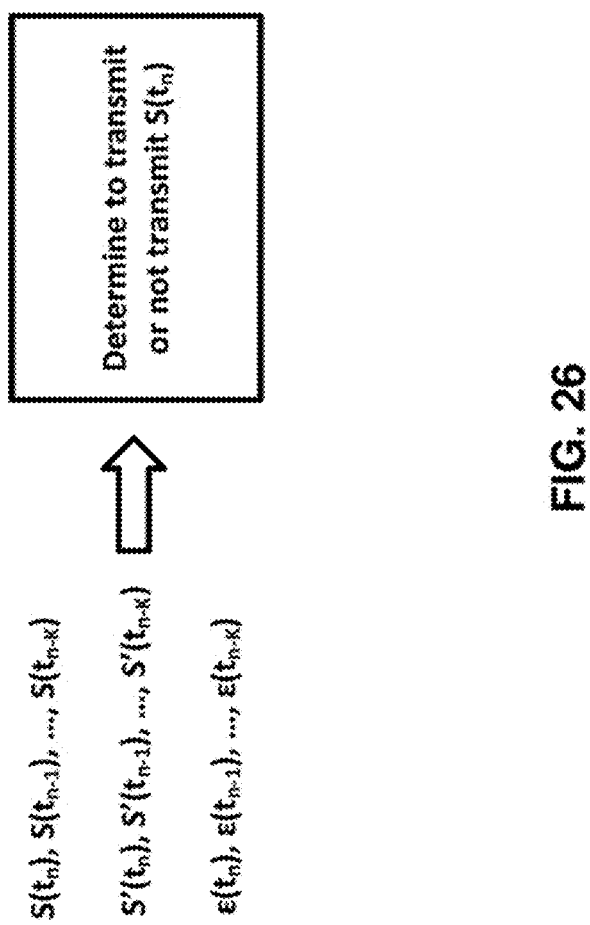
FIG. 26 shows an example process according to some aspects of some of various exemplary embodiments of the present disclosure.

The IoT device may use the prediction-based model and the one or more first configuration parameters and may determine whether to transmit the first data sample to the NTN node. In some examples, the IoT device may use the prediction model and may determine a plurality of predicted values corresponding to a plurality of data samples. The plurality of data samples may comprise the first data samples. For example, the plurality of data samples may comprise the first data sample and the last K data samples prior to the first data sample. In some examples, K may be pre-configured and/or part of the prediction based model. In some examples, K may be configurable (e.g., RRC configurable). In some examples, the determination whether to send the first data sample or not may be based on the first data sample and the corresponding predicted value. In some examples as shown in FIG. 26, the determination whether to send the first data sample or not may be based on the plurality of data samples (e.g., the first data sample and the last K data samples prior to the first data sample). In some examples, the determination to transmit the first data sample may be based on one or more thresholds (e.g., one or more pre-configured thresholds or one or more configurable (e.g., RRC configurable) thresholds). In some examples, the determination to transmit the first data sample may be based on a prediction error (e.g., a difference between the first data sample and the corresponding data value) being larger than a threshold. In some examples, the determination to transmit the first data sample may be based on each of a plurality of prediction errors (e.g., each of differences between the data samples and the corresponding predicted values) being larger than a threshold.

In some examples, the IoT device may determine, based on the prediction-based model resulting in an erroneous predicted value, to transmit the first data sample. The IoT device may transmit the first data sample to the NTN node based on a determination to transmit the first data sample. In some examples, the IoT device may determine, based on the prediction-based model resulting in predicted value with a bounded/acceptable error, not to transmit the first data sample. The IoT device may not transmit the first data sample this determination. In some examples, in response of the error being bounded, the IoT device may not transmit the first data sample or any other value (e.g., the predicted value). In some examples, transmission of the first data sample, in a timing associated with the first data sample, may indicate that the predicted value associated with the first data sample is erroneous.

Figure 27:
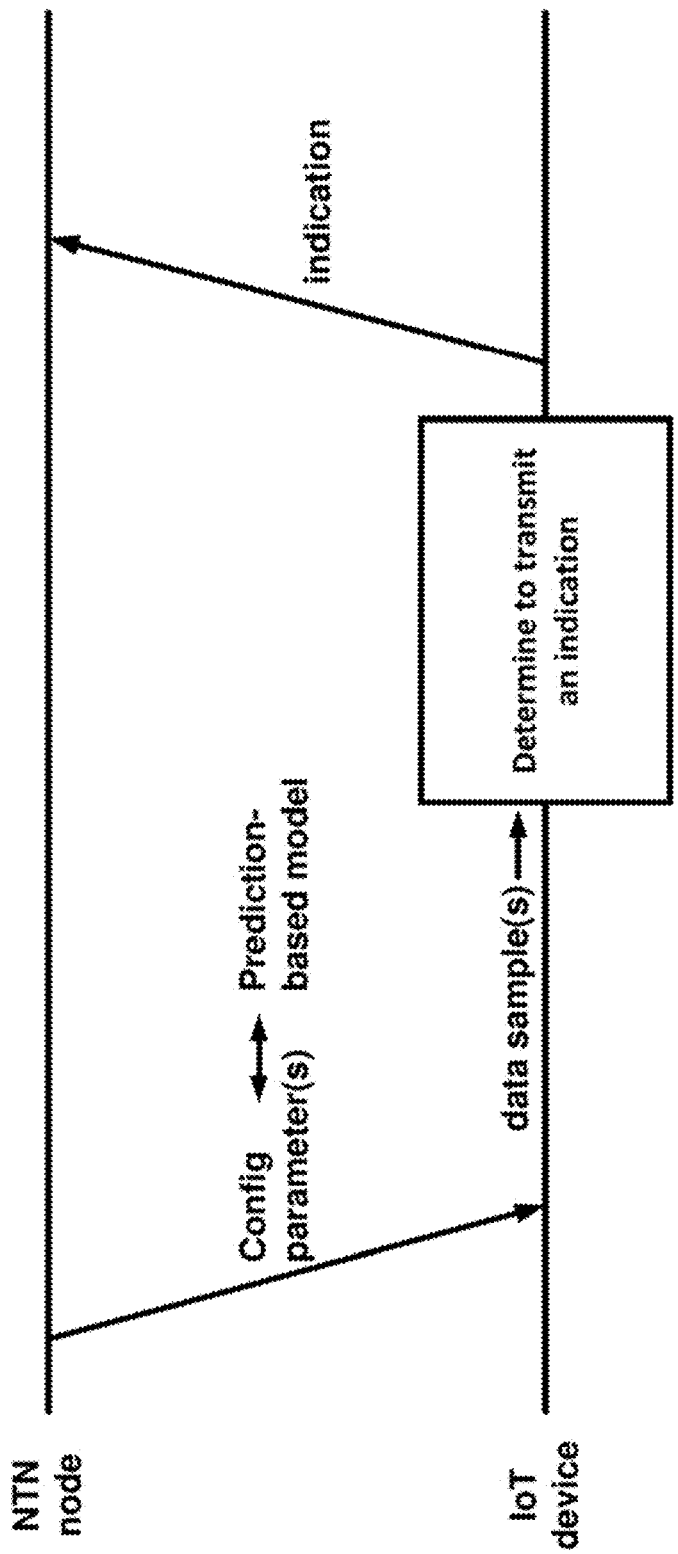
FIG. 27 shows an example process according to some aspects of some of various exemplary embodiments of the present disclosure.

In some examples as shown in FIG. 27, the IoT device may transmit an indication (e.g., via an RRC message or an uplink control information or a MAC CE) indicating a need to update the prediction based model and/or indicating that an absolute error value is larger than a threshold (e.g., pre-configured or configurable, e.g., RRC configurable threshold) and/or indicating that an absolute positive error value is larger than a threshold or that an absolute negative error is larger than a threshold, etc.

In some examples, the IoT device may transmit an indication (e.g., via an RRC message or an uplink control information or a MAC CE) indicating a need to update the prediction based model and/or indicating that an absolute error value, of each of a plurality or error values, is larger than a threshold (e.g., pre-configured or configurable, e.g., RRC configurable threshold) and/or indicating that an absolute positive error value, of each of a plurality or positive error values, is larger than a threshold or that an absolute negative error, of each of a plurality or negative error values, is larger than a threshold (e.g., pre-configured or configurable, e.g., RRC configurable threshold), etc.

In some examples, in response to a determination (e.g., at the NTN node) to update the prediction-based model, the IoT device may receive one or more second configuration parameters associated with the prediction-based model. The determination to update the prediction-based model may be based on receiving, by the NTN node, assistance information and/or indications from the IoT device (e.g., indications that prediction error(s) associated a plurality of predicted values are larger than a threshold).

In some examples, the prediction-based model may utilize one or more coefficients. The configuration parameters, associated with the prediction-based model, may indicate the one or more coefficients. In some examples, in response to updating the prediction-based model, the NTN node may transmit second configuration parameters indicating new values of the one or more coefficients.

Figure 28:
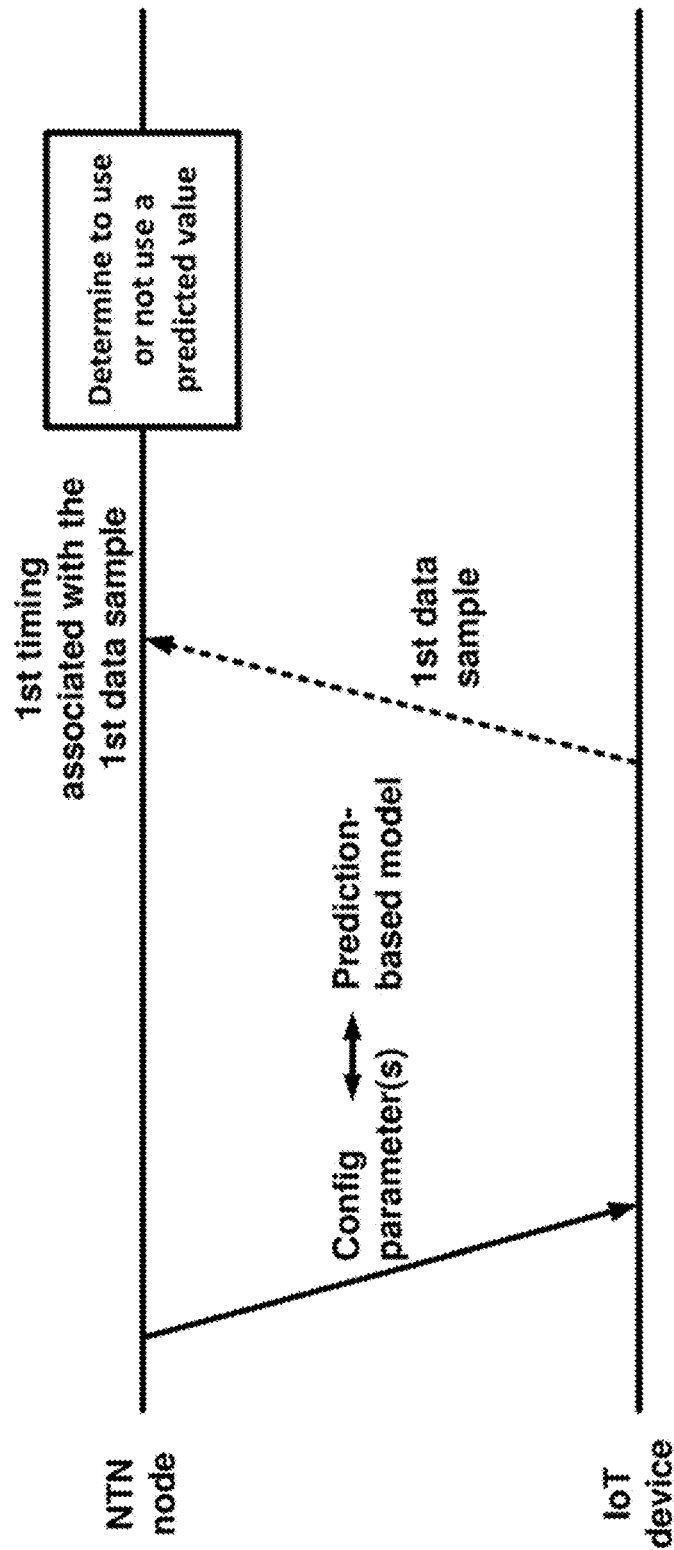
FIG. 28 shows an example process according to some aspects of some of various exemplary embodiments of the present disclosure.

In an example embodiment as shown in FIG. 28, an NTN Node (e.g., a ground station) may transmit to an internet of things (IoT) device may receive one or more messages (e.g., one or more RRC messages) comprising configuration parameters. The configuration parameters may comprise first configuration parameters associated with a prediction-based model. In some examples, the transmitting of the configuration parameters, associated with the prediction-based model may be in response to receiving a capability message comprising one or more information elements indicating that the IoT device is capable of supporting and operating based on the prediction-based model. In some examples, the prediction-based model may be activated in response to transmitting the one or more configuration parameters. In some examples, the prediction-based mode may be activated in response to transmitting the configuration parameters and an activation command e.g., a DCI or a MAC CE indicating the activation. The prediction-based model may be used by the IoT device for data transmission. The prediction-based model may be used in parallel at the NTN node and the IoT device. The IoT device may determine a first data sample. The first data sample may be based on a measurement performed at the IoT device. For example, the IoT device may be a sensor and the first data sample may be a temperature, humidity, etc. measured via the sensor. In some examples, the data samples may be generated/measured by the IoT device using a pre-determined schedule. In some examples, the pre-determined schedule may be based on a periodicity and the measurements/samples may be performed/generated periodically and based on the schedule/periodicity. The IoT device may determine the timings of the data samples (including the first data sample) based on the schedule/periodicity known at the IoT device and the NTN node.

In some examples, the NTN node may receive or may not receive the first data sample from the IoT device at a first timing associated with the first data sample. In response to not receiving the first data sample at the first timing, the NTN node may determine that a predicted value corresponding to the first data sample is usable and the NTN node may determine the predicted value associated with the first data sample. In response to receiving the first data sample at the first timing, the IoT device may determine that the predicted value corresponding to the first data sample may not be usable and the NTN node may not use the prediction-based model.

Figure 29:
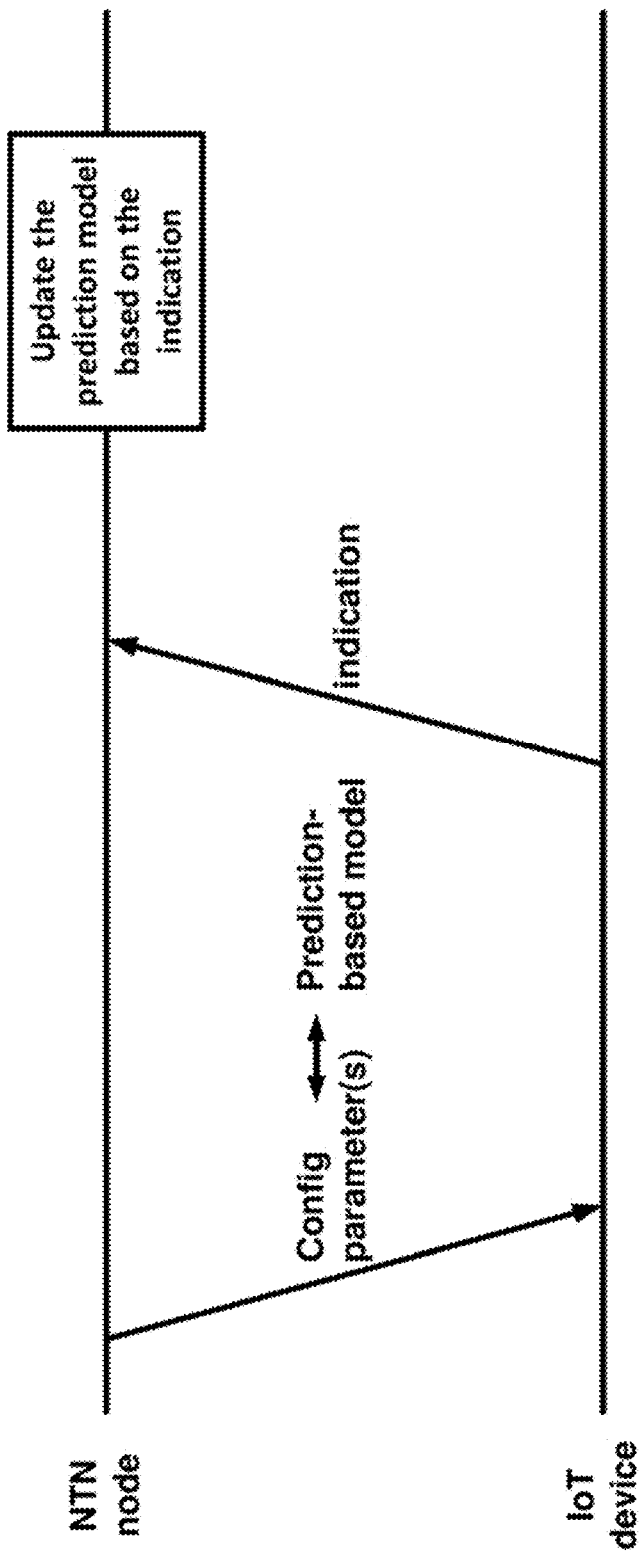
FIG. 29 shows an example process according to some aspects of some of various exemplary embodiments of the present disclosure.

In some examples as shown in FIG. 29, the NTN node may receive from the IoT device an indication (e.g., via an RRC message or an uplink control information or a MAC CE) indicating a need to update the prediction based model and/or indicating that an absolute error value is larger than a threshold (e.g., pre-configured or configurable, e.g., RRC configurable threshold) and/or indicating that an absolute positive error value is larger than a threshold or that an absolute negative error is larger than a threshold, etc.

In some examples, the NTN node may receive from the IoT device an indication (e.g., via an RRC message or an uplink control information or a MAC CE) indicating a need to update the prediction based model and/or indicating that an absolute error value, of each of a plurality or error values, is larger than a threshold (e.g., pre-configured or configurable, e.g., RRC configurable threshold) and/or indicating that an absolute positive error value, of each of a plurality or positive error values, is larger than a threshold or that an absolute negative error, of each of a plurality or negative error values, is larger than a threshold (e.g., pre-configured or configurable, e.g., RRC configurable threshold), etc.

In some examples, in response to a determination at the NTN node to update the prediction-based model, the NTN node may transmit to the IoT device one or more second configuration parameters associated with the prediction-based model. The determination to update the prediction-based model may be based on receiving, by the NTN node, assistance information and/or indications from the IoT device (e.g., indications that prediction error(s) associated a plurality of predicted values are larger than a threshold).

In some examples, the prediction-based model may utilize one or more coefficients. The configuration parameters, associated with the prediction-based model, may indicate the one or more coefficients. In some examples, in response to updating the prediction-based model, the NTN node may transmit second configuration parameters indicating new values of the one or more coefficients.

In an example embodiment, an internet of things (IoT) device may receive one or more configuration parameters associated with a prediction-based model. The IoT device may determine a first data sample based on a measurement performed by the IoT device. The IoT device may determine, based on the prediction-based model and using the one or more configuration parameters, whether to transmit the first data sample to a non-terrestrial networking (NTN) node. The IoT device may transmit the first data sample to the NTN node in response to determining to transmit the first data sample.

In some examples, the transmitting the first data sample may be an indication that a predicted value corresponding to the first data sample is erroneous.

In some examples, the IOT device may determine, based on the prediction model, one or more predicted values corresponding to one or more data samples comprising the first data sample. In some examples, the determining to transmit the first data sample may be based on the one or more data samples and one or more corresponding predicted values corresponding to the one or more data samples. In some examples, the determining to transmit the first data sample may further be based on one or more thresholds. In some examples, the determining to transmit the first data sample may be based on a difference between the first data sample and a corresponding predicted value being larger than a threshold. In some examples, the one or more configuration parameters may comprise one or more first parameters indicating the one or more thresholds. In some examples, the determining to transmit the first data sample may be based on a difference between each of the one or more data samples and the corresponding predicted value being larger than a threshold. In some examples, a predicted value corresponding to the first data sample may be based on the first data sample and one or more previous data samples. In some examples, a number of the one or more previous data samples may be pre-configured. In some examples, the one or more configuration parameters may comprise a first parameter indicating a number of the one or more previous data samples.

In some examples, the IoT device may transmit an indication indicating that an absolute value of an error for a predicted value is larger than a threshold. In some examples, the indication may indicate that the error is positive. In some examples, the indication may indicate that the error is negative. In some examples, the one or more configuration parameters may comprise a first parameter indicating the threshold. In some examples, the threshold may have a pre-configured value.

In some examples, the IoT device may transmit an indication indicating that each of a plurality of absolute values of a plurality of errors for a plurality of predicted values is larger than a threshold. In some examples, the indication may indicate that each of the plurality of errors is positive. In some examples, the indication may indicate that each of the plurality of errors is negative. In some examples, the one or more configuration parameters may comprise a first parameter indicating the threshold. In some examples, the threshold may have a pre-configured value.

In some examples, the IoT device may receive, in response to a determination to update the prediction model, one or more second configuration parameters associated with the prediction-based model. In some examples, the determination may be made at the non-terrestrial networking (NTN) node.

In some examples, the one or more configuration parameters, used in the prediction-based model, may indicate one or more coefficients of the prediction-based model.

In some examples, the IoT device may receive an activation command indicating activation of the prediction-based model. In some examples, the activation command may be based on physical layer signaling or medium access control (MAC) layer signaling.

In some examples, the IoT device may transmit a capability message comprising one or more information elements indicating that the internet of things (IoT) device supports one or more parameters associated with data transmission using the prediction-based model.

In an example embodiment, a non-terrestrial networking (NTN) node may transmit to an internet of things (IoT) device, one or more configuration parameters associated with a prediction-based model. In response to not receiving, by the NTN node, a first data sample from the IoT device at a first timing associated with the first data sample: the NTN node may determine that a predicted value corresponding to the first data sample may be usable, and may determine the predicted value based on the prediction-based model. In response to receiving, by the NTN node, the first data sample from the IoT device at the first timing: the NTN node may determine that the predicted value is not usable.

In some examples, the first timing may be based on a periodicity.

In some examples, the NTN node may receive an indication indicating that an absolute value of an error for a predicted value is larger than a threshold. In some examples, the indication may indicate that the error is positive. In some examples, the indication may indicate that the error is negative. In some examples, the NTN may update the prediction model based on the indication.

In some examples, the NTN node may receive an indication indicating that each of a plurality of absolute values of a plurality of errors for a plurality of predicted values is larger than a threshold. In some examples, the indication may indicate that each of the plurality of errors is positive. In some examples, the indication may indicate that each of the plurality of errors is negative. In some examples, the NTN node may update the prediction model based on the indication.

In some examples, the one or more configuration parameters, used in the prediction-based model, may indicate one or more coefficients of the prediction-based model.

In some examples, the NTN node may receive a capability message comprising one or more information elements indicating that the internet of things (IoT) device supports one or more parameters associated with data transmission using the prediction-based model.

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

The invention claimed is:

1. A method of data transmission between an internet of things (IoT) device and a non-terrestrial network (NTN) that enhances battery life of the IoT device in reliance upon a prediction-based model at the NTN, the method implemented at the IoT device and comprising the steps of:
- transmitting, by the IoT device, a capability message indicating that the IoT device is capable of supporting the prediction-based model;
- in response to transmitting the capability message, receiving, by the IoT device, one or more configuration parameters associated with a prediction-based model including indicating activation of the prediction-based model, wherein the prediction-based model allows for reduced power consumption of the IoT device, thereby enhancing battery life;
- performing a measurement by the IoT device based on a periodicity and by generating data samples using a pre-determined schedule;
- determining, by the IoT device, a first data sample based on the measurement performed by the IoT device using the pre-determined schedule;
- determining, by the IoT device, a plurality of predicted values, based on the prediction-based model, the one or more configuration parameters and the measurement using the pre-determined schedule, and deciding whether or not to transmit the first data sample to the NTN node based on the plurality of predicted values; and
- transmitting or not transmitting the first data sample to the NTN node in response to the determining whether or not to transmit.

2. The method of claim 1, wherein the transmitting indicates that a predicted value of the plurality of predicted values corresponding to the first data sample is erroneous.

3. The method of claim 1, further comprising determining, based on the prediction-based model, one or more of the plurality of predicted values corresponding to one or more data samples comprising the first data sample.

4. The method of claim 3, wherein the determining whether to transmit the first data sample is based on the one or more data samples and the one or more predicted values corresponding to the one or more data samples.

5. The method of claim 4, wherein the determining whether to transmit the first data sample is further based on one or more thresholds.

6. The method of claim 5, wherein the determining whether to transmit the first data sample is based on a difference between the first data sample and a corresponding predicted value of the plurality of predicted values being larger than a threshold.

7. The method of claim 5, wherein the determining whether to transmit the first data sample is based on a difference between each of the one or more data samples and a corresponding predicted value of the plurality of predicted values being larger than a threshold.

8. The method of claim 3, wherein a predicted value of the plurality of predicted values corresponding to the first data sample is based on the first data sample and one or more previous data samples.

9. The method of claim 1, further comprising transmitting an indication that an absolute value of an error for a predicted value of the plurality of predicted values that is larger than a threshold.

10. The method of claim 9, wherein the indication indicates that the error is positive or negative.

11. The method of claim 9, wherein the one or more configuration parameters comprise a first parameter indicating the threshold.

12. The method of claim 1, further comprising transmitting an indication that each of a plurality of absolute values of a plurality of errors for each of the plurality of predicted values is larger than a threshold.

13. The method of claim 1, further comprising receiving, in response to a determination to update the prediction model, one or more second configuration parameters associated with the prediction-based model.

14. The method of claim 13, wherein the determination is made at the non-terrestrial networking (NTN) node.

15. The method of claim 1, wherein the one or more configuration parameters, used in the prediction-based model, indicate one or more coefficients of the prediction-based model.

16. The method of claim 1, further comprising receiving an activation command indicating activation of the prediction-based model, based on physical layer signaling or medium access control (MAC) layer signaling.

17. A method of data transmission between an internet of things (IoT) device and a non-terrestrial network (NTN) node that enhances battery life of the IoT device in reliance upon a prediction-based model, the method implemented at the NTN node and comprising the steps of:
- receiving, from the IoT device, a capability message indicating that the IoT device is capable of supporting the prediction-based model;
- in response to receiving the capability message from the IoT device, transmitting, by the NTN node to the IoT device, one or more configuration parameters associated with the prediction-based model, wherein the prediction-based model allows for reduced power consumption of the IoT device, thereby enhancing battery life of the IoT device in reliance upon the prediction-based model;
- determining, by the NTN node, a first timing associated with a pre-determined schedule;
- in response to not receiving, by the NTN node, a first data sample from the IoT device at the first timing associated with the pre-determined schedule:
  - determining that a predicted value corresponding to the first data sample is valid, which can be utilized in place of the first sample; and
  - determining the predicted value based on the prediction-based model and the validity of the predicted value; and
- in response to receiving, by the NTN node, the first data sample from the IoT device at the first timing:
  - determining that the predicted value is not valid, wherein the invalid prediction value cannot be used in place of the first sample.

18. The method of claim 17, further comprising receiving an indication that an absolute value of an error for a predicted value is larger than a threshold.

19. The method of claim 18, further comprising updating, by the non-terrestrial networking node (NTN), the prediction model based on the indication.

20. A method of data transmission between an internet of things (IoT) device and a non-terrestrial network (NTN) node that enhances battery life of the IoT device in reliance upon a prediction-based model of the NTN, the method implemented at the NTN node and comprising the steps of:
- transmitting, by the IoT device, a capability message indicating that the IoT device is capable of supporting the prediction-based model, transmitting, by the NTN node to the IoT device, one or more configuration parameters associated with a prediction-based model, wherein the prediction-based model allows for reduced power consumption of the IoT device, thereby enhancing battery life of the IoT device;

in response to receiving the capability message, determining, by the NTN node, a first timing associated in a pre-determined schedule;

in response to not receiving, by the NTN node, a first data sample from the IoT device at the first timing associated with the first data sample using the pre-determined schedule:
- determining that a predicted value corresponding to the first data sample is valid, and that the predicted value can be utilized in place of the first sample; and
- determining the predicted value based on the prediction-based model and the validity of the predicted value; and in response to receiving, by the NTN node, the first data sample from the IoT device at the first timing:
- determining that the predicted value is not valid, such that the invalid predicted value cannot be used in place of the first sample,
- wherein the first timing is based on a periodicity.

* * * * *